United States Patent
Densham et al.

(10) Patent No.: US 9,538,156 B2
(45) Date of Patent: Jan. 3, 2017

(54) SYSTEM AND METHOD FOR PROVIDING 3D SOUND

(75) Inventors: Gilray Densham, Inglewood (CA); Justin Eichel, Waterloo (CA)

(73) Assignee: CAST Group of Companies Inc., Toronto (CA)

( * ) Notice: Subject to any disclaimer, the term of this patent is extended or adjusted under 35 U.S.C. 154(b) by 510 days.

(21) Appl. No.: 13/982,722

(22) PCT Filed: Jan. 31, 2012

(86) PCT No.: PCT/CA2012/050056
§ 371 (c)(1),
(2), (4) Date: Jul. 30, 2013

(87) PCT Pub. No.: WO2012/103649
PCT Pub. Date: Aug. 9, 2012

(65) Prior Publication Data
US 2013/0307934 A1 Nov. 21, 2013

Related U.S. Application Data

(60) Provisional application No. 61/438,080, filed on Jan. 31, 2011.

(51) Int. Cl.
*H04N 5/247* (2006.01)
*H04N 13/02* (2006.01)
(Continued)

(52) U.S. Cl.
CPC .......... *H04N 13/0203* (2013.01); *G01S 3/802* (2013.01); *G03B 31/00* (2013.01); *H04N 5/222* (2013.01); *H04N 5/247* (2013.01)

(58) Field of Classification Search
None
See application file for complete search history.

(56) References Cited

U.S. PATENT DOCUMENTS 5,959,667 A  9/1999  Meang
6,275,258 B1  8/2001  Chim
(Continued)

FOREIGN PATENT DOCUMENTS

EP  0813073 A2  12/1997

OTHER PUBLICATIONS

Mozerov, Mikhail, et al. "A simple method of multiple camera calibration for the joint top view projection." Computer Recognition Systems 2. Springer Berlin Heidelberg, 2007. 164-170.*
(Continued)

*Primary Examiner* — Sath V Perungavoor
*Assistant Examiner* — Clifford Hilaire
(74) *Attorney, Agent, or Firm* — Blake, Cassels & Graydon LLP; Wilfred P. So

(57) ABSTRACT

Systems and methods are provided for associating position information and sound. The method includes obtaining position information of an object at a given time; obtaining position information of a camera at the given time; determining a relative position of the object relative to the camera's position; and associating sound information with the relative position of the object. In another aspect, the position and orientation of a microphone are also tracked to calibrate the sound produced by an object or person, and the calibrated sound is associated with the relative position of the object, that is relative to the camera.

12 Claims, 17 Drawing Sheets

(51) Int. Cl.
*G01S 3/802* (2006.01)
*G03B 31/00* (2006.01)
*H04N 5/222* (2006.01)

(56) References Cited

U.S. PATENT DOCUMENTS

| | | | |
|---|---|---|---|
| 6,281,930 B1* | 8/2001 | Parker | H04N 5/232 |
| | | | 250/206.2 |
| 6,469,732 B1* | 10/2002 | Chang | G10L 25/78 |
| | | | 348/14.01 |
| 6,940,540 B2 | 9/2005 | Beal et al. | |
| 2003/0081504 A1* | 5/2003 | McCaskill | G01S 3/8083 |
| | | | 367/118 |
| 2003/0210329 A1 | 11/2003 | Aagaard | |
| 2004/0110561 A1* | 6/2004 | Kawamura | A63F 13/10 |
| | | | 463/35 |
| 2005/0008169 A1 | 1/2005 | Muren | |
| 2005/0281410 A1* | 12/2005 | Grosvenor | H04H 60/47 |
| | | | 381/61 |
| 2007/0233321 A1 | 10/2007 | Suzuki | |
| 2007/0273766 A1 | 11/2007 | Wilson | |
| 2008/0037802 A1* | 2/2008 | Posa | H04N 7/142 |
| | | | 381/77 |
| 2008/0261693 A1 | 10/2008 | Zalewski | |
| 2009/0228422 A1* | 9/2009 | Yen | G10L 17/26 |
| | | | 706/52 |
| 2009/0238378 A1* | 9/2009 | Kikinis | H04N 13/0497 |
| | | | 381/92 |
| 2010/0073363 A1 | 3/2010 | Densham et al. | |
| 2012/0050535 A1 | 3/2012 | Densham et al. | |

OTHER PUBLICATIONS

Chellappa, Rama, Gang Qian, and Qinfen Zheng. "Vehicle detection and tracking using acoustic and video sensors." Acoustics, Speech, and Signal Processing, 2004. Proceedings.(ICASSP'04). IEEE International Conference on. vol. 3. IEEE, 2004.*

Linco, Reginald; International Search Report from corresponding PCT Application Serial No. PCT/CA2012/050056; search completed Jun. 8, 2012.

Supplementary Partial European Search Report issued in corresponding EP Application No. EP12741868; search completed Apr. 30, 2015.

* cited by examiner

*Object shown on screen

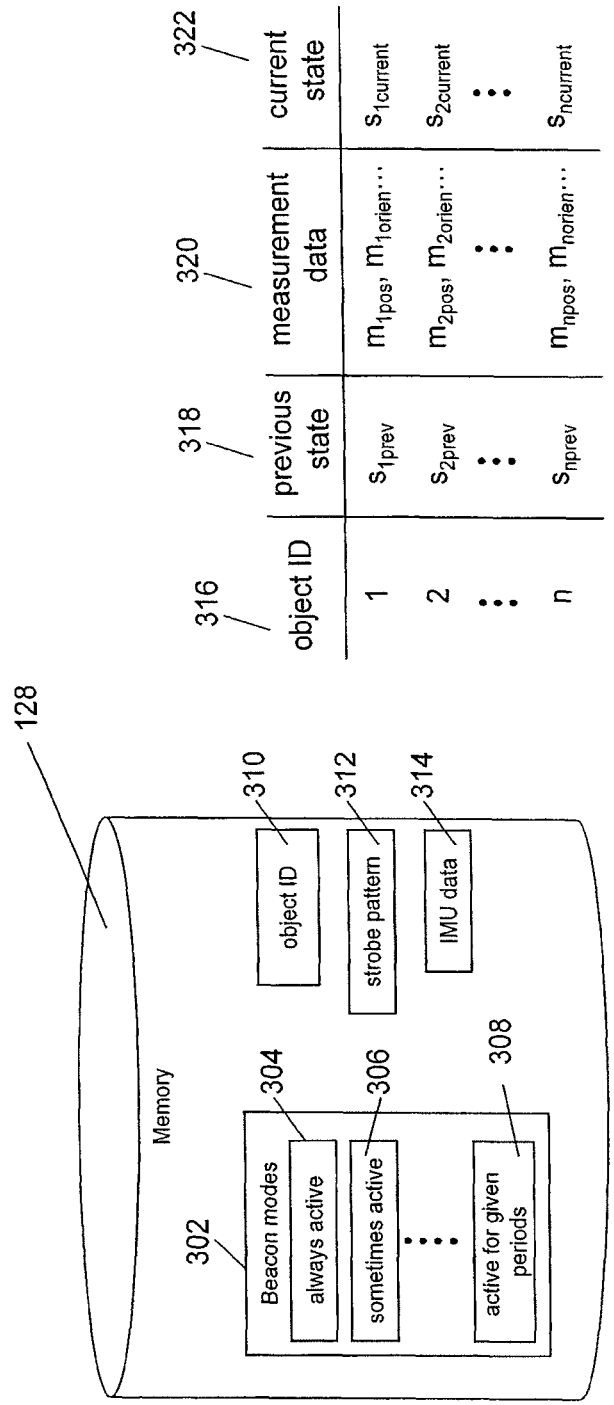

SYSTEM AND METHOD FOR PROVIDING 3D SOUND

CROSS-REFERENCE TO RELATED APPLICATIONS

This application claims priority from U.S. Provisional Application No. 61/438,080 filed on Jan. 31, 2011, the entire contents of which are herein incorporated by reference.

TECHNICAL FIELD

The following relates generally to providing three dimensional position information in association with sound.

DESCRIPTION OF THE RELATED ART

Sound is the oscillation of pressure that travels through a medium (e.g. gas, liquid, solid) and that can be sensed by auditory means, such as, for example, a person's auditory organs or a microphone. Sound can be generated through various ways, such as a person speaking and vibrating an object (e.g. car engine, sound speakers, bouncing ball, etc.).

In some situations, it is desirable to find the location of where the sound is generated. For example, in a room filled with people, several people may be speaking simultaneously and it can be difficult to determine who is speaking. In another example, when producing movies or the like, there may be multiple people or objects generating sounds and it can be difficult to determine which sounds are attributed to specific people or objects.

The challenge of determining the location of where a sound is generated is further complicated when the source of the sound is in motion. For example, a speeding car, a bouncing ball, or a moving person generate sounds as they travel.

In addition to location, the precise location of where a sound is generated and the orientation or direction that the sound is travelling is difficult to determine. For example, the sound of a person speaking will change as they face different directions.

In view of the above, it can be seen that determining the location of where a sound is generated, as well as the ability to associate a sound with a location, is a significant problem.

The discussion above is merely provided for general background information and is not intended to be used as an aid in determining the scope of the claimed subject matter.

SUMMARY

In an example aspect, a method is provided for associating position information and sound. The method includes obtaining position information of an object at a given time; obtaining position information of a camera at the given time; determining a relative position of the object relative to the camera's position; and associating sound information with the relative position of the object.

In another example aspect, a method is provided for associating position information and sound recorded by a microphone. The method includes obtaining position information of an object at a given time; obtaining position information of a camera at the given time; obtaining position information of a microphone at the given time; obtaining sound information associated with the object at the given time using the microphone; determining a relative position of the object relative to the camera's position and a relative position of the microphone relative to the object's position; generating calibrated sound information using the sound information and the relative position of the microphone; and, associating the calibrated sound information with the relative position of the object.

In another example aspect, a method is provided for tracking a microphone relative to a camera's viewing frustum. The method includes obtaining one or more dimensions of a camera's viewing frustum in three-dimensional space; obtaining a position of a microphone; and, if the position of the microphone is within the camera's viewing frustum, then recording a timestamp at which the microphone is within the camera's viewing frustum.

In another example aspect, a method is provided for controlling a microphone that is able to be automatically positioned by an actuator system. The method includes obtaining one or more dimensions of a viewing frustum of a camera in three-dimensional space; obtaining position information of the microphone; and, providing one or more commands to the actuator system to prevent the microphone from being positioned within the viewing frustum of the camera.

This Summary is provided to introduce a selection of concepts in a simplified form, examples of which are described in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments will now be described by way of example only with reference to the appended drawings wherein:

FIG. 7 is a block diagram of example data components in the tracking unit's memory.

FIG. 8 is a schematic diagram of example data components in the tracking engine's state machine.

DETAILED DESCRIPTION

Figure 1:
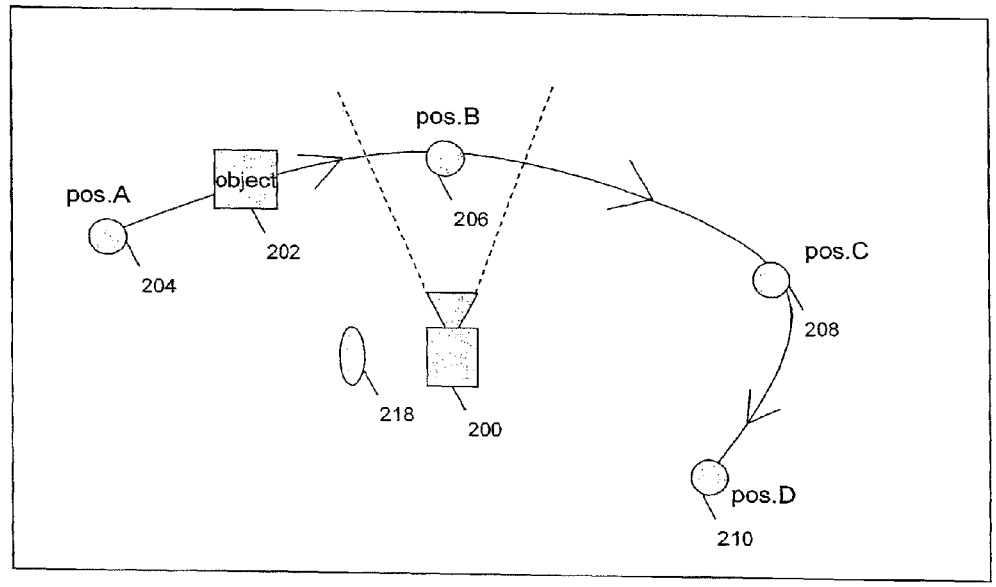
FIG. 1 is a schematic diagram of a plan view illustrating an example of a camera and a microphone recording an object moving between different positions.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is recognized that sounds can be generated from different objects and people, which may or may not be in motion, and that associating recorded sounds with the relevant object or person can be difficult. For example, when using a camera or video camera to record images of people in a room and recording sounds (e.g. conversation) made by the people, it can be difficult to identify where, or which person, was the source of the sound. It is also difficult to accurately extract speech attributed to one person who is part of a crowd or group of people; this is a scenario applicable to the film industry and the security industry. In another example, in security applications when monitoring an environment using a video camera and a microphone, it is recognized that sound provides valuable information and linking the sound to the source is important. Such a need for associating sound with a source, namely a location of an object, is also recognized in the movie and television production industry. In the movie or television industry, it is recognized that a sound track can be mapped or layered on to a series of video images, in which the location of the sound is perceived to move with the position of an object that is being filmed.

By way of background, turning to FIG. 1, a top-down view is provided of an example scenario in which a camera 200 records or films a moving object 202, such as a car, airplane, or person. The object 202 makes sounds as it moves from position A 204, to position B 206, to position C 208, and finally to position D 210. A conventional method of recording the sounds is to use a microphone 218 placed at the camera 200, or elsewhere, such as extended on a microphone boom or attached to the object 202. Notably, the object 202 is only within the camera's field of view, as represented by the dashed lines, in position B 206. In position A 204, position C 208, and position D 210, the object 202 is not in the camera's field of view. Although the camera 200 cannot "see" the object 202 in all these positions, the microphone 218 is able to record the sounds of the object 202 in all positions.

Also by way of background, turning to FIG. 2A to FIG. 2D, the recorded sounds and images of the object 202, as shown in FIG. 1, can be played back to a person 212 through sound speakers and a display screen 214 (e.g. television screen or movie screen). In many movie theatres, there are multiple sound speakers placed around a person to provide surround sound. There are also differential speakers that provide "3D sound". In other words, based on the position of the sound speakers relative to a person, or based on the time difference that it takes for sound to reach one ear before the same sound reaches the other ear, or both, an audio perception is created allowing a person to identify the location from which the sound originates in three-dimensional space. For example, surround sound or 3D sound is able to simulate the effect that a flying insect is flying and buzzing around a person's head.

Figures 2A, 2B, 2C, 2D:
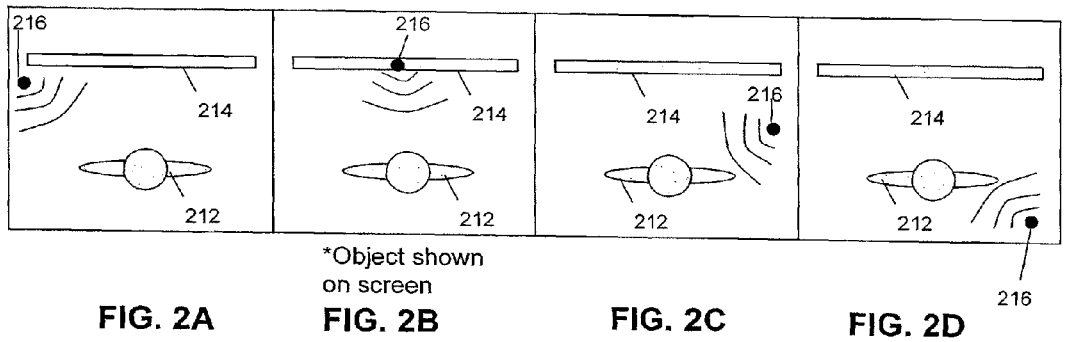
FIG. 2A, FIG. 2B, FIG. 2C, and FIG. 2D are plan views illustrating a person watching a display screen and the placement of 3D sound sources.

Turning to FIG. 2A, as shown from a plan view, a person 212 is facing a display screen 214. The display screen 214 shows the video images of the object 202 captured by the camera 200. When the object 202 is at position A 202, the display screen 214 does not display the object 202 since it is not within the camera's field of view. However, the sound of the object 202 is still provided. The location 216 from where the sound of the object 202 is generated (e.g. by a sound speaker) is positioned to the left of the person 216. This is to accurately replicate or simulate the scenario of FIG. 1, in which the object 202 is at position A 202 to the left of the camera 200. In this way, the person 212 experiences the sounds and sights from the perspective of the camera 200. Therefore, even though the person 212 does not see the object 202 on the display screen 214, the person 212 is able to hear that the object is approaching from the left side.

Turning to FIG. 2B, since the object 212 moves towards the right from position A 202 to position B 206, as recorded by the camera 200 and microphone, the visual image of the object 202 is shown moving across the display screen 214 towards the right. The location 216 from which the sound of the object 202 is generated is in front of the person 216. This simulates the position of the object 202 at position B 206 in front of the camera 200. The person 212 perceives that the object 202 is located in front using both visual and auditory senses.

FIG. 2C shows the simulation or recording corresponding to when the object 202 is at position C 208. The display screen 214 does not show the image of the object 202, since the object 202 is out the camera's field of view. The sound of the object 202 is generated at a location 216 to the right of the person 216. This simulates that the object is still moving and is now positioned to the right of the person 212, although the object 202 is positioned "off" the display screen 208.

Similarly, in FIG. 2D, which corresponds to position D 210, the object 202 moves behind the right side of the camera 200. This movement and positioning of the object 202 is simulated using sound by placing the location 216 of where the sound is generated behind the right side of the person 212.

In general, the person 212 is able to perceive where the object 202 is located from a given position, such as the position of the camera 200, based on the sound.

In conventional approaches, the location 216 of where the sound is generated is based on an approximation of where the object 202 is located relative to the camera 200 or any other given position. For example, in movie production, an audio/visual technician will manually specify that the object 202 is moving from the left to the right, and therefore the volume of the sound is initially louder on a left sound speaker and then eventually louder on a right sound speaker. Such an approach is time consuming for the technician and is prone to inaccuracy. It is difficult to accurately time the transition of when the sound source is moving from one location to another. For example, if the object 202 is moving at various speeds and accelerations, then the location 216 of where the sound is generated should also move at the same various speeds and accelerations to accurately correspond with the object 202. It is also difficult to determine the exact location of where to position the sound.

In an example of recording video data and sound data, a stereo microphone is placed on a camera. This may allow for sound to be recorded relative to the camera's perspective. However, if a virtual object, for example a computer generated object or graphic, is inserted into the video image, a stereo microphone on a camera does not provide any means to determine the characteristics of the sound generated from the virtual object. Instead, a technician may have to manually edit the sound characteristics of the virtual object to correlate with the position of the virtual object. Moreover, the recorded sound from the stereo microphone is difficult to edit. In many instances, the sound recorded by the a microphone located at the camera, does not record high quality sound. Usually, microphones are placed closer to the sound source to record higher quality sound. In other words, in many example use cases, a microphone or mic, is placed in a different location compared to a camera. This configuration, compared to having a microphone placed on a camera, allows for a higher quality sound track to be recorded, and further allows the higher quality sound track to be edited with more control.

The proposed systems and methods described herein address the above issues by accurately tracking an object in 3D space and associating the sounds with the tracked positions of the object. The time at which an object is at a given location is also recorded so that the sounds can be more easily aligned or mapped to the object's location. Additionally, the orientation of the object is recorded as this affects the sound in some situations. For example, if a person is oriented to face a camera, the person's voice is louder. Conversely, when the person is facing away from the camera, the person's voice is quieter.

Figure 3:
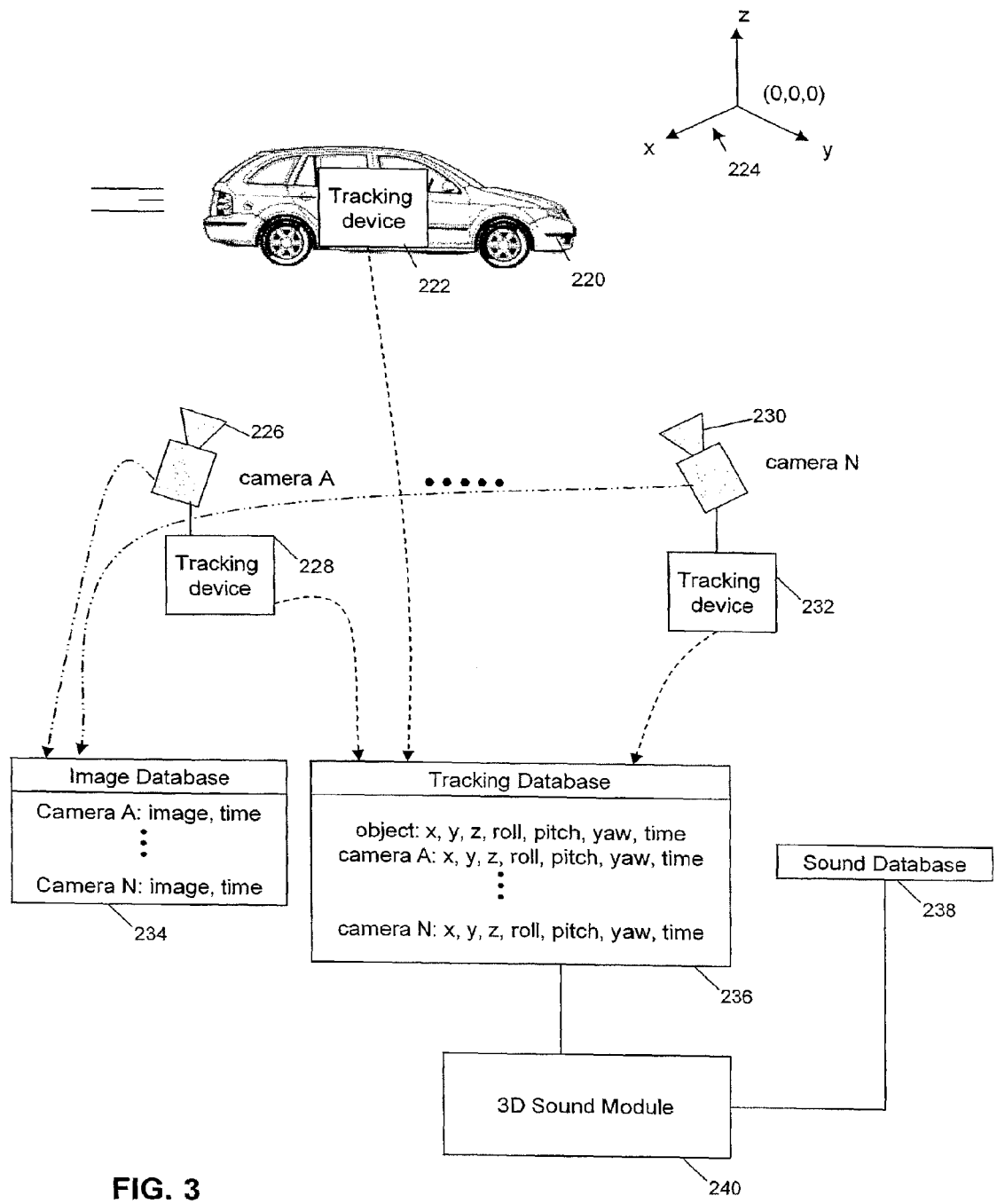
FIG. 3 is a system diagram illustrating example components for tracking an object's location and associating sound with the object's location.

FIG. 3 provides an example system configured to track the position of one or more objects and associate sound information with the position information of the object. The sound information can be from a sound database 238 and may or may not be recorded live. In this example, the object is a car 220. Camera A 226 and camera N 230 record video images of the moving car 220. The sound of a pre-recorded car engine, obtained from a sound database 238, is layered on top of the recorded video image of the moving car 220 and is associated with the car's actual position information. In other words, the pre-recorded car engine sound can be recorded from the actual moving car 220 or can be created or recorded from other means. Although the example embodiment of FIG. 3 refers to a car 220, it is appreciated that any object can be used. Non-limiting examples of other objects include a helicopter, an animal, a person, a roller-coaster car, and a projectile.

The car's position and orientation are tracked in 3D space. A tracking system external to the car 220 or attached to the car 220, or a combination of both, can be used to track the car 220. There are various methods and devices that can be used to track the car 220, or any other object. Some examples include image tracking, GPS, local positioning systems, inertial measurement units (for measuring acceleration and angular rotation), triangulation of radio signals, RADAR, SONAR, and combinations thereof. For brevity of terminology and representation encompassing the various tracking methods, a tracking device 222 is shown being attached to the car 220 to track and record the car's position information and orientation information.

The position or orientation, or both, of one or more cameras, e.g. camera A 226 and camera N 230, are also being tracked as represented by the associated tracking devices 228 and 232, respectively. In an example embodiment, the cameras 226, 230 are stationary. In another example embodiment, the cameras can move position and orientation. In many situations, a camera can move on a rail system or on a robotic type armature.

The tracking devices 222, 228, 232 obtain position information and orientation information about the car 220, camera A 226 and camera N 230, respectively. This information is tracked over time, and is associated with time information, such as a time stamp. The position information, orientation information and associated time are stored in a tracking database 236. In other words, at a given time or a specific time, the position and orientation of any of the car 220, camera A 226 and camera N are known. The tracking devices 222, 228, 232 can transmit the position information, orientation information, time stamps, etc. to the tracking database 236 through wireless means or wired means.

The images captured by camera A 226 and camera N 230 are also stored in an image database 234. The images are also associated with time, e.g. time stamps.

The physical environment in which the car 220 is moving is represented as a data model of a 3D virtual environment. A point 224 in the physical environment is established as an origin of a position coordinate system. This point 224 of origin is represented is also represented in the virtual environment for which there is a virtual position coordinate system corresponding to that in the physical environment.

The position and orientation information of the car 220 and the cameras 226, 230 are determined relative to this point 224 of origin.

Various types of position coordinate systems can be used, including a Cartesian coordinate or a polar coordinate system. For ease of explanation, a Cartesian coordinate system is used to identify the position of a point in space. Therefore, the position information includes x, y, z coordinates and the orientation information includes roll, pitch, and yaw angles around the x, y and z axes.

Continuing with FIG. 3, a 3D sound module 240, which is a computing device, retrieves from the tracking database 236 the position information of the car 220 at a given time and the position information of a camera (e.g. camera A 226) at the same given time. The 3D sound module determines or computes a relative position of the car 220 to camera A's position. The 3D sound module 240 then associates sound information (e.g. sound of a pre-recorded car engine) with the relative position of the car. As a result, the proposed system and method provides at least position information of the car 220 from the perspective of camera A's position and associated sound information. This information can be used to accurately simulate the 3D positioning of sound. For example, when a person watches a display screen showing an image of the car 220 that has been recorded from camera A 226, based on the 3D positioning of sound, the person will then perceive (from auditory senses) that the car is at the computed position and orientation relative to the position of camera A 226. The person, from an auditory perception, will feel as if they were standing where camera A 226 was located relative to the car 220.

In an example embodiment, the tracking database 236 and the 3D sound module 240 are part of a configurable real-time environment tracking and command module (RTM), which can relay information about a physical environment to various connected devices. The RTM may be used to coordinate the devices operating within the physical environment. Information about a physical environment includes the movement of objects in six degrees of freedom (e.g. up/down; forward/backward; left/right; roll; pitch; and yaw). Other types of information are described below. It can be appreciated that the RTM may comprise any computing device or server able to execute computer readable instructions and able to access memory storage devices. Real-time herein refers to both hard real-time systems (e.g. completion of an operation after its deadline is not tolerated) and soft real-time systems (e.g. completion of an operation after its deadline is tolerated). The devices, e.g. physical devices, connected to the RTM, may be referred to herein as clients. It can be appreciated that the types of clients may vary and can depend on the physical environment in which it is operating. A client can be any type of device that can be configured to exchange computer executable instructions or data with the RTM. The tracking devices 222, 228, and 232 are considered clients of the RTM. Details of the RTM are described in U.S. patent application Ser. No. 12/421,343, having Publication No. 2010/0073363 to Gilray Densham et al., the contents of which are herein incorporated by reference in its entirety. An example embodiment of the RTM is commercially available under the trade-mark BlackBox by CAST Group of Companies Inc.

To coordinate the clients, the RTM provides information allowing one client to interact with another client. The RTM has a common interface that facilitates communication with clients. In other words, the RTM's common interface can transmit or receive data, or both, from various physical devices or clients. Examples of interfaces for communicating with clients include universal serial bus (USB), FireWire™, serial port interfaces, Bluetooth™, and other cabled and wireless communication mediums. It can be appreciated that any communication interface suitable for a computing device may be suitable. In an example embodiment, the data or information exchanged between the RTM and the clients is considered live, or real-time, allowing the clients to synchronize their actions.

Figure 4:
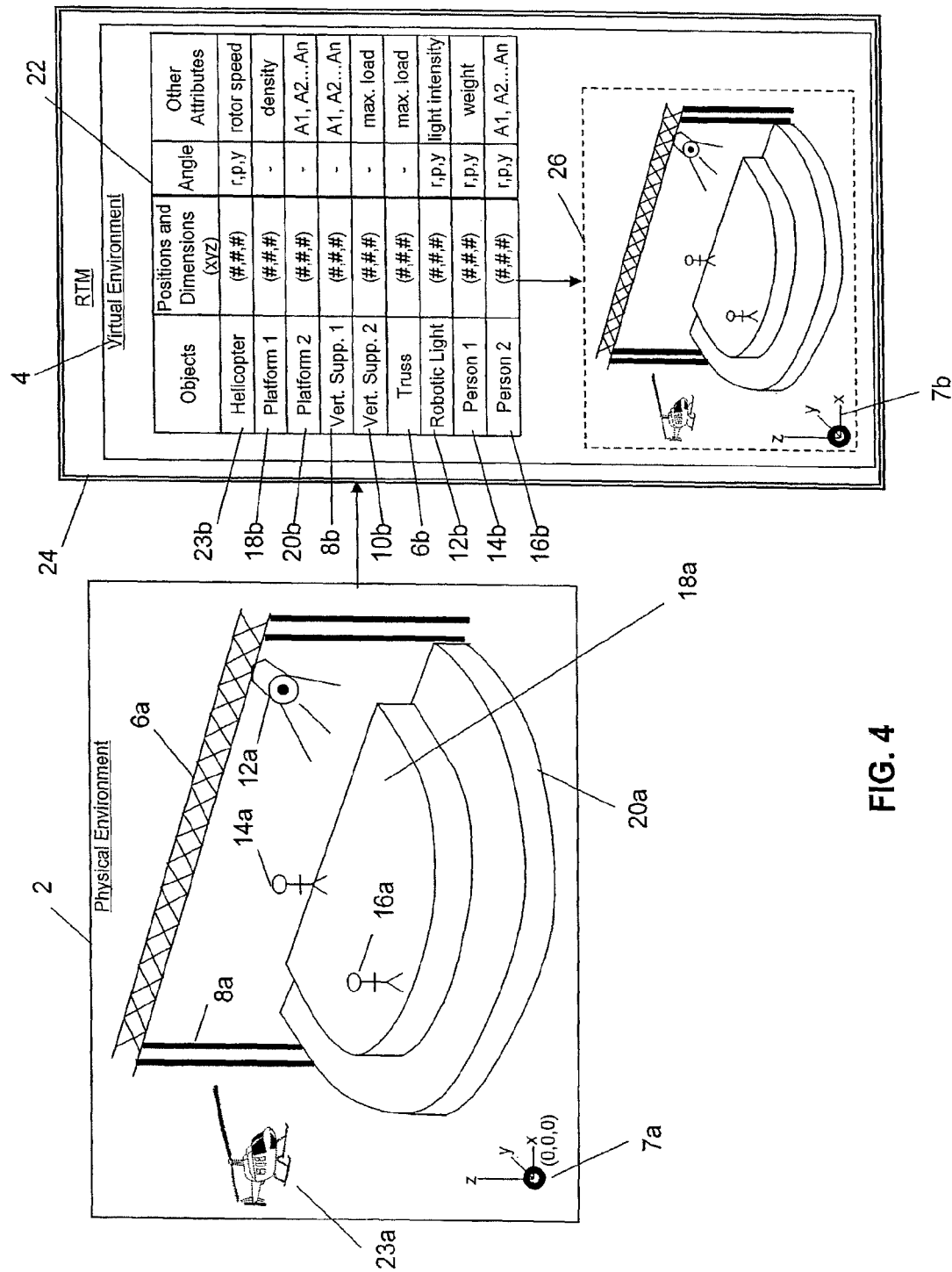
FIG. 4 is a system diagram illustrating an example embodiment of generating a virtual environment from a physical environment.

Turning to FIG. 4, to further explain the concept of a physical environment and a virtual environment, which can be managed by the RTM 24, a system diagram is provided showing objects in a physical environment 2, in this case a stage, mapping onto a virtual environment 4. It can be appreciated that the virtual environment 4 resides within a computing environment, for example, having various processors, memory, interfaces, computer readable media, etc. Moreover, the virtual environment 4 can also be part of the RTM 24. A memory storage or database 22 of virtual objects and attributes is provided to correspond with the physical objects in the physical environment 2. For clarity, references to physical objects include the suffix 'a' and references to virtual objects include the suffix The physical environment 2 in FIG. 4 comprises a first platform 18a supported below by a second platform 20a. An overhead truss 6a extends across the platforms 18a, 20a and is supported at its ends by two vertical supports 8a, 10a. A robotic light 12a is supported on the truss 6a for illuminating the first platform 18a, whereupon a first person 14a and a second person 16a are positioned. A wirelessly controlled helicopter drone 23a is flying above the platforms 18a, 20a. A three-dimensional origin or physical reference point 7a is positioned in front of the platforms 18a, 20a, whereby the positions of the physical objects are measured relative to the physical reference point 7a.

Each of these physical objects in the physical environment 2 are mapped onto the virtual environment 22, such that the virtual environment database 22 organizes the corresponding virtual objects and any corresponding attributes. The physical reference point 7a is mapped into the virtual environment 22, thus forming a virtual origin or reference point 7b. The positions of the virtual objects are mapped relative to the virtual reference point 7b. In this example, the virtual objects comprise a virtual helicopter 23b, a first virtual platform 18b, a second virtual platform 20b, a first vertical support 8b, a second vertical support 10b, a virtual truss 6b, a virtual robotic light 12b, a first virtual person 14b, and a second virtual person 16b. Physical attributes corresponding to each physical objects are also represented as virtual attributes corresponding to each virtual object, wherein attributes typically include the position and dimensions of the objects as well as any data related to movement of the objects as well as any data related to movement of the objects (e.g. speed). In one embodiment, the position may be represented in Cartesian coordinates, such as the X, Y and Z coordinates. Other attributes that may also be used to characterize a virtual object include the rotor speed for the helicopter 23a, the maximum loads on the truss 6a, and the weight of a person 14b.

Figure 5:
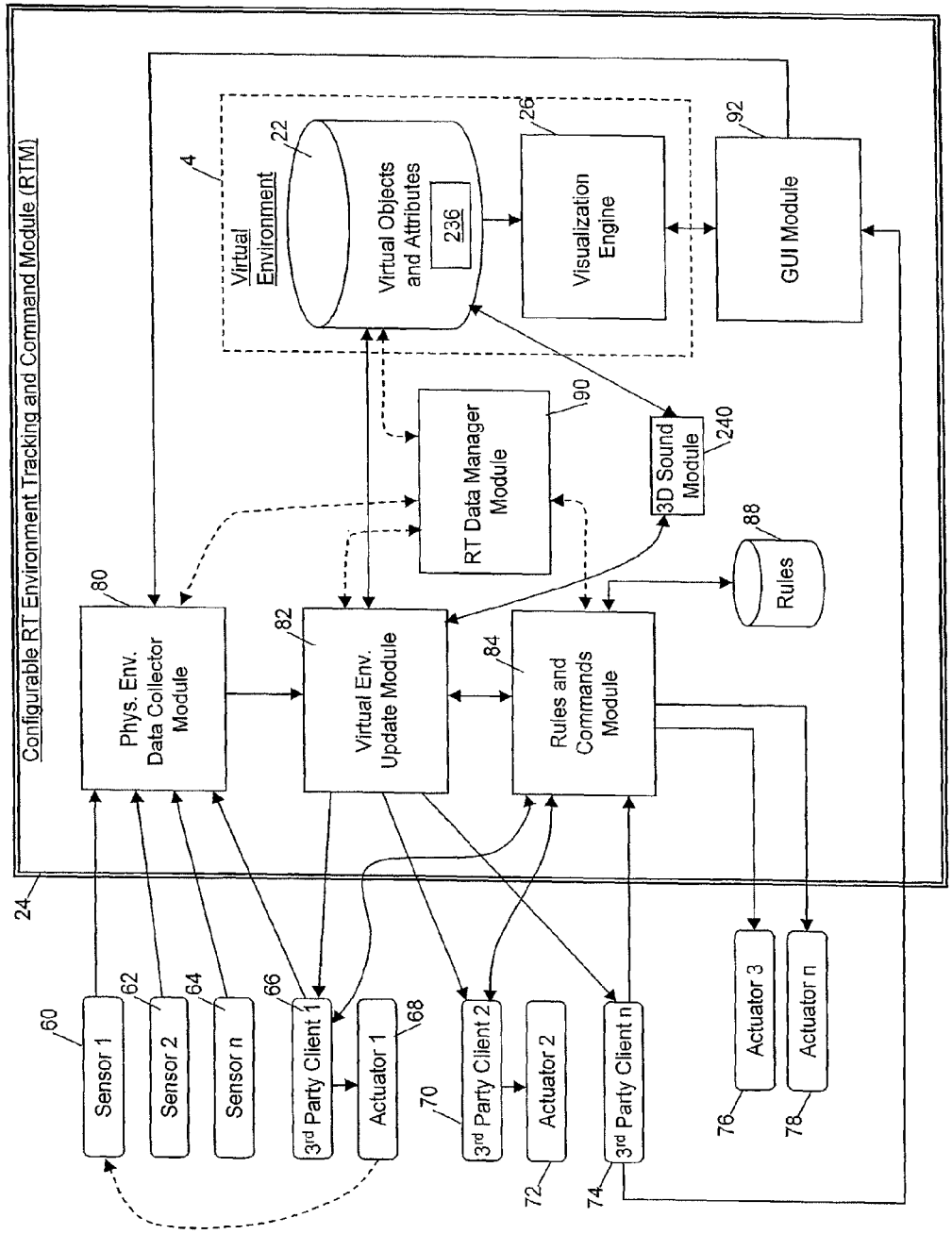
FIG. 5 is a system diagram showing an example configuration of a configurable real-time environment tracking and command module (RTM) connected to various devices for tracking or controlling physical objects.

The tracking database 236 may be a part of the environment database 22, which includes the position information, orientation information, time, etc. of the physical objects (e.g. car 220, camera A 226, camera N 230). This is shown in FIG. 5.

It can be appreciated that accurately depicting the virtual environment 4 to correspond to the physical environment 2 can provide a better understanding of the physical environment, thereby assisting the coordination of the clients within the physical environment. The process of depicting attributes of a physical object onto a corresponding virtual object can be considered a physical-to-virtual mapping. Accurately depicting the virtual environment 4, for example, comprises generating virtual objects based on data automatically provided by clients connected to the RTM 24. Alternatively, some of the virtual objects and their corresponding attributes may be manually entered into the virtual environment database 22. For example, an operator or technician of the RTM 24 may gather the dimensions of a truss and determine its center of mass and volumetric center. The operator may then create a virtual object with the same dimensions, center of mass and volumetric center that corresponds to the truss. The physical location of the truss, with respect to the physical reference point 7a, is also used to characterize the location of the virtual object. Thus, the virtual object corresponds very closely to the truss in the physical environment.

It can also be appreciated that the location of the physical reference point 7a can be positioned in any location. Preferably, the location of the physical reference point 7a is selected in a fixed, open area that facilitates consistent and clear measurement of the locations of physical objects relative to the physical reference point 7a. As can be seen from FIG. 4, the physical reference point 7a is located at the coordinates (0,0,0) in the physical environment. Similarly, the virtual reference point 7b is mapped in the same position as the physical reference point 7a and is located at the coordinates (0,0,0) in the virtual environment. It can be appreciated that accurate correlation between the reference points 7a, 7b can be used to calibrate and verify the correspondence between the physical and virtual environments.

Continuing with FIG. 4, a visualization engine 26 uses the information stored in the virtual environment database 22 to generate a graphic, thereby illustrating or visualizing the physical environment 2 to permit interaction with a user. In other words, the visualization engine 26 provides a graphic of the virtual environment 4, which in turn substantially corresponds to the physical environment 2. In the configuration according to FIG. 4, the visualization engine 26 is part of the virtual environment 24.

In an example embodiment, the virtual environment 4 is also used for acoustic modelling. The position and shape of objects, as well as the movement of the objects, can affect how sound travels from a sound's source position to a listener's (or listening device's) receiving position. The virtual environment 4, as represented by the database 22 of virtual objects, can be used to compute and simulate reflections, transmission, and diffractions paths, which the sounds uses to travel.

Turning to FIG. 5, an example configuration suitable for coordinating multiple clients in a physical environment is provided. It can be appreciated that the devices that are external to the RTM 24 and connected to the RTM 24 may be referred to as clients. Therefore, the sensors 60, 62 and 64, the $3^{rd}$ party clients 66, 70 and 74, and the actuators 68, 72, 76 and 78 are considered to be clients to the RTM 24. Examples of sensors may include the tracking devices 222, 228, 232 described earlier. The RTM 24 comprises a physical environment data collector module 80, a virtual environment update module 82, a rules and commands module 84, a number of rules in a rules database 88, a real-time (RT) data manager module 90, a graphical user interface (GUI) module 92, and virtual environment 4, wherein the virtual environment 4 comprises the virtual objects and attributes database 22 and the visualization engine 26. For clarity, the virtual objects and attributes database 22 is herein referred to as the virtual environment database 22. As can be seen, the virtual environment update module 82 is in communication with the data collector module 80, rules and commands module 84 and virtual environment database 22. The rules and commands module 84 is in communication with the rules database 88. The visualization engine 26 is in communication with the virtual environments database 22 and GUI module 92. It can be appreciated that one or more processors execute the computer instructions from each module or engine. Moreover, the databases can be stored on memory devices, such as random access memory or read only memory devices.

The physical environment data collector module 80, herein referred to as the collector module, is able to receive data from clients, such as sensors 60, 62 and 64, and $3^{rd}$ Party Client 1 (66). The collector module 80 may comprise or interact with one or more interfaces, not shown, to communicate with the various clients. As can be seen, Sensor 1 (60) tracks the activity or attribute of Actuator 1 (68) and relays the sensed data to the collector module 80. In addition, the collector module 80 can receive commands, for example, from $3^{rd}$ Party Client 1 (66) and from the GUI module 92, as discussed in greater detail below. Upon receiving the data from the sensors or commands from other consoles, the collector module 80 sends the collected data to the virtual environment update module 82. The virtual environment update module 82, also referred to as the update module, is able to exchange data with the virtual environment database 22, as well as send or broadcast data to clients, including $3^{rd}$ Party Client 1 (66), $3^{rd}$ Party Client 2 (70) and $3^{rd}$ Party Client n (74). The update module 82 broadcasts data to the clients through one or more communication interfaces within the RTM 24. The update module 82 also exchanges information with the rules and commands module 84.

In one example, data about a physical object is sent from Sensor 1 (60) and received by the collector module 80, which in turn transmits the data to the update module 82. The update module 82 sends the data about the physical object to the virtual environment database 22 to update the attribute of the corresponding virtual object. The update module 82 also sends the updated data to $3^{rd}$ Party Client 2 (70), which may use the data to control Actuator 2 (72).

In another example, $3^{rd}$ Party Client 1 (66) sends a command (e.g. to move Actuator 3 (76)) to the collector module 80, wherein the collector module 80 then transmits the command to the update module 82. The command triggers a rule, as stored in the rules database 88, which limits the movement of the Actuator 3 (76) since it may collide with another virtual object. In other words, if the predetermined condition of the positions are met, then a response is generated for the physical environment and the RTM 24 provides the response to the Actuator 3 (76). It can be appreciated that a number of predetermined conditions and responses may be stored in the form of rules in the rules database 88. The rule that limits the movement of the Actuator 3 (76) is executed or processed and sent via the rules and command module 84 to the update module 82. Thus, the modified command, now limited according to the rule, is sent from the update module 82 to the virtual environment database 22 thereby updating virtual Actuator 3 (not shown), which corresponds to physical Actuator 3 (76). The modified command is also sent from the update module 82 to the rules and commands module 84, and from there to physical Actuator 3 (76). It can be seen that the rules and commands module 84 is also indirectly in communication with the virtual environment database 22 and monitors any changes therein to determine whether one or more rules should be executed.

In the process of updating the virtual environment database 22, the update module 82 relies on the rules and command module 84 to execute various instructions including, for example, calculations for inverse kinematics, kinematics, and dynamics.

The 3D sound module 240 interacts with the update module 82 or the virtual environment database 22 to retrieve the data obtained from the tracking devices 222, 228, 232. As will be explained below, the 3D sound module 240 may also use kinematic calculations to determine relative positioning and orientation.

Continuing with FIG. 5, the information from the virtual environment database 22 may be retrieved by the visualization engine 26 to provide a graphic on a display. In some cases, the visualization engine 26 may interact with a GUI module 92 to allow a user to manipulate a virtual object in the virtual environment 4, which in turn controls the corresponding physical object in the physical environment 2.

For example, when $3^{rd}$ Party Client n (74) receives an update about a physical object based on the corresponding virtual object from the update module 82, a user of $3^{rd}$ Party Client n (74) may click and drag that virtual object across a certain distance using the GUI module 92. This manipulation of the virtual object's position is considered a command from the physical environment and is thus relayed to, and received by, the collector module 80.

To facilitate real-time functionality, if desired, in the embodiment shown in FIG. 5, a real-time (RT) data manager module 90 is provided. Various other aspects of the RTM 24 may interact with the RT data module 90, including the collector module 80, update module 82, rules and commands module 84 and virtual environment database 22. In one aspect, the RT data manager module 90 processes or relays time-sensitive data (e.g. real-time data) prior to data that is not time-sensitive (e.g. non-real-time data). In another aspect, the RT data manager 90 may also determine time sensitivity or priority for the data and commands collected from the collector module 80.

Since the RTM 24 is a computing device, it can be appreciated that the modules, visualization engine and managers may operate on a single processor or several processors. In some cases, each module may reside on a separate processor, such that a multi-processor system executes the computer instructions of each module in parallel to increase the operable speed of the RTM 24. As such, it is appreciated that the modules and separation of duties exemplified here are illustrative only and various ones of the modules and/or operations may be implemented in different arrangements to suit the particular application.

It is noted that the RTM 24 described here is an example embodiment used to track and manage position information, orientation information, time, sound, etc. Different or simplified variations of a computing module can be used to organize and store the information in the tracking database 236.

Figure 6:
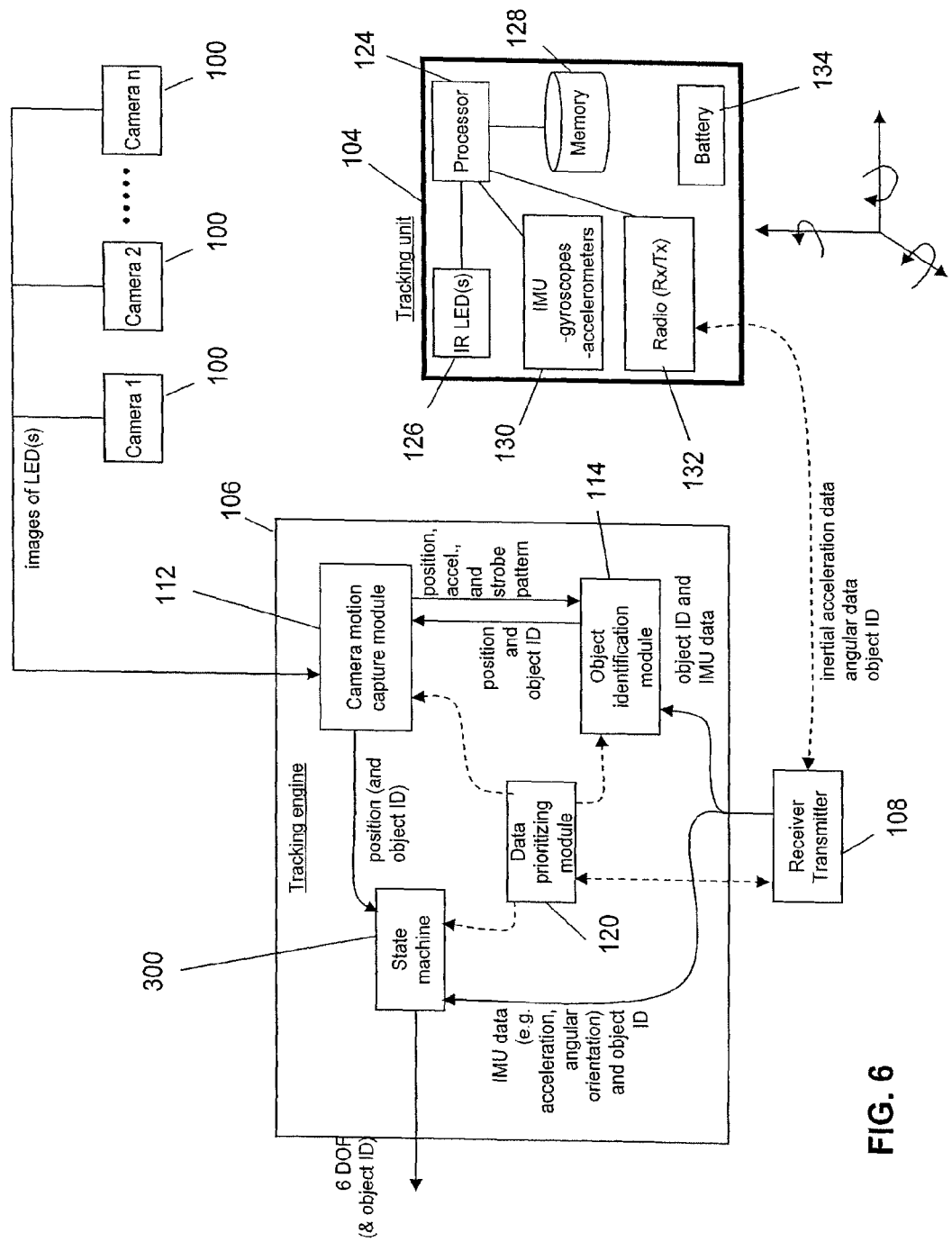
FIG. 6 is a block diagram of an example configuration of a tracking engine and tracking unit.

Regarding the tracking systems used to obtain the position information and orientation information, an example embodiment is described in FIG. 6. The tracking devices described here can be also called a tracking unit 104.

In an example embodiment, the tracking device 222, for tracking an object, comprises a tracking unit 104 attached to the car 220, two or more tracking cameras 100 and a tracking engine 106. The cameras 100 of FIG. 6 are part of the tracking device 222 used to visually track an object, and are different from the cameras 226, 230 used to record video images. Similarly, in another example embodiment, the tracking devices 228, 232 also comprise the tracking unit 104, tracking engine 106, and tacking cameras 100, and such tracking devices 228, 232 can be used to track the position or orientation, or both, of the cameras 226, 230.

In FIG. 6, a tracking unit 104 and a tracking engine 106 are shown. Two or more cameras 100 are used to provide tracking in three dimensions. Using known optical tracking methods, the cameras' 2D images of a light source 126 are used to triangulate a 3D position (e.g. X, Y, Z coordinate) for the light source 126. Although two cameras are sufficient for determining the position, more than two cameras (e.g. three cameras) can provide more accurate data and can track an object from more angles. It is noted that an infrared LED 126 is one of many different types of light sources 126 that can be used herein, and thus, reference numeral 126 is used interchangeably with the infrared LED and with light sources (e.g. passive reflectors) in general.

The tracking unit 104 includes a processor 124, one or more infrared LEDs 126, an inertial measurement unit (IMU) 130, a radio 132, memory 128 and a battery 134. Although a battery 134 is shown, the tracking unit 104 can be powered through alternate known means, such as power chords. Further, although a radio 132 is shown, wired or wireless communication devices can be used with the tracking unit 104.

The IMU 130 measures at least angular orientation. The combination of orientation information from the IMU 130 and position information from the image tracking of the light source 126 provide the six degrees of freedom.

The packaging or assembly of the tracking unit or tracking apparatus 104 can vary. For example, the LED 126 may be located on one part of the object and the IMU 130 may be located on another part of the object. In another example, the LED 126 could be attached to the object by plugging in the LED 126 into the object, and connecting the LED 126 to the processor 124 through wired or wireless communication. The tracking unit or tracking apparatus 104 can be attached to an object using a belt, fastener, adhesive, clip, weld, bolts, etc. In another embodiment, more than one tracking unit 104 can be attached to an object. For example, when tracking different body parts on a person, one tracking unit 104 can be placed on an arm, another tracking unit 104 can be placed on the person's waist, and another tracking unit 104 can be placed on a leg. It can therefore be appreciated that the tracking unit 104 can be attached to an object in various ways.

The battery 134 can be rechargeable and is used to power the components of the tracking unit 104. The IMU 130 may comprise three axis gyroscopes and three axis accelerometers for measuring angular orientation and inertial acceleration, respectively. The angular orientation information and inertial acceleration measured from the IMU 130 is wirelessly transmitted through the radio 132 to the tracking engine 106. As described above, other data communication methods and devices are also applicable. The processor 124 also associates with the IMU data an object identification. The object identification can be stored in memory 128. As discussed earlier, tracking units 104 can be associated with a strobe pattern. Therefore, the memory 128 can store the strobe pattern for the infrared LED 126 and the associated object identification. The processor 124 retrieves the object identification and wirelessly transmits the object identification with the IMU measurements; this data is received by the receiver and transmitter 108 at the tracking engine 106. The processor 124 also retrieves the strobe pattern associated with the object identification and controls the flashing of the infrared LED 126 according to the strobe pattern. The processor 124 also has the ability to send commands, for example, through the radio 132, to activate operations in other control devices. Although not shown, in an embodiment using wireless communication, the antennae of the receiver and transmitter 108 can be physically attached to the cameras 100 in order to create a wireless mesh allowing the tracking engine 106 to more easily communicate with the one or more tracking units 104. In other words, each camera 100 can attached an antenna of the receiver and transmitter 108. The wireless communication can, for example, use the Zigby protocol.

Turning briefly to FIG. 7, example data components are shown in the tracking unit's memory 128. The memory 128 includes an object ID 310, a strobe pattern 312, and IMU data 314. Any data, such as IMU data 314, that is transmitted from the tracking unity 104 to the tracking engine 106 is accompanied by the object ID 310. In this way, the tracking engine 106 can correlate the tracking unit data with an object ID 310. As described above, the strobe pattern 312 is also associated with the object ID 310. In some cases the strobe pattern 310 is unique from other strobe patterns to uniquely identify the object ID 310. The memory 128 also includes beacon modes 302, which determine the manner in which the tracking unit 104 gathers and transmits data to the tracking engine 106. Example beacon modes include "always active" 302, "sometimes active" 306 and "active for given periods" 308. In mode 304, the tracking unit 104 always activates the one or more light sources 126 and always transmits angular orientation data, acceleration data, etc. In mode 306, the tracking unit 104 sometimes activates the one or more light sources 126, and sometimes transmits the IMU data. In mode 308, the one or more light sources 126 are active for only certain or predetermined periods of time and the IMU data is transmitted at the same times. Other beacon modes 302 (not shown) may include activating the one or more light sources 126 but not the IMU 130, or vice versa. It can be appreciated that the beacon modes 302 may be selected using controls, such as buttons or switches, (not shown) on the tracking unit. In addition, or in the alternative, the beacon modes 302 may be selected by the tracking engine 106. The tracking engine 106 can send commands to the tracking unit 104 to select different beacon modes 302. It can be appreciated that selecting different beacon modes 128 can help manage the processing of data by the tracking engine 106. For example, objects that are considered important can have attached tracking units 104 that are in an "always active" beacon mode 304. Objects considered less important can have attached tracking units 104 that are in a "sometimes active" beacon mode 306. In this way, less data is obtained and processed by the tracking engine 106, thereby reducing the tracking engine's processing load.

Although not shown, the tracking unit 104 can include other devices, such as magnetometers and gravity sensors, to measure other attributes.

Turning back to FIG. 6, the light from the infrared LED 126 is detected by two or more cameras 100. The cameras 100 are preferably able to acquire images at a high rate and are connected to the tracking engine 106 in a way to increase data transfer. For example, the cameras can gather images at 240 frames per second and are connected in a star configuration. The cameras may also be Ethernet gray scale cameras that provide a resolution of 0.8 megapixels. The camera images are sent to the tracking engine 106.

The tracking engine 106 can be a computing device or series of computing devices operating together, herein collectively referred to as a computing device. The tracking engine 106 includes: a camera motion capture module 112 for identifying the one or more light sources and associated data (e.g. position, acceleration, heading, strobe patterns, etc.); an object identification module 114 for identifying objects and associated data; a data prioritizing module 120 for prioritizing the processing and transfer of data; and a state machine 300 for collecting different data measurements and calculating the current state (e.g. position and angular orientation) of one or more objects.

The camera motion capture module 112 receives the images from the cameras 100 and determines the three dimensional position of each infrared LED 126. Known imaging and optical tracking techniques can be used. It will be appreciated, however, that the proposed systems and methods described herein are able to track and identify many objects based on the imaging data, and such systems and methods can be combined with imaging techniques.

The camera motion capture module 112 is also able to detect strobe patterns of the LEDs. In one embodiment, the camera motion capture module 112 uses the strobe patterns to differentiate light sources 126 for tracking from other light sources (e.g. car lights, decorative lights, cell phone lights, etc.) that are not used for tracking. In other words, only light sources 126 having a strobe pattern are tracked for their position.

The camera motion capture module 112 can also extract data for identifying objects. In one approach for identifying an object, the camera motion capture module 112 determines the current position of an infrared LED 126 and sends the current position to the object identification module 114. The object identification module 114 compares the current position with previous positions that are associated with known object IDs. If a current position and a previous position are sufficiently close to one another, taking into account the time elapsed between the position measurements, then the current position of the infrared LED 126 is associated with the same object ID corresponding to the previous position. The object identification module 114 then returns the position and object ID to the camera motion module 112. In another approach, the camera motion capture module 112 determines the acceleration and heading of a given infrared LED 126 and this information is sent to the object identification module 114. The object identification module 114 also receives from a tracking unit 104 acceleration data and an associated object ID. The object identification module 114 then compares the acceleration determined from the camera motion capture module 112 with the acceleration sent by the tracking unit 104. If the acceleration and headings are approximately the same, for example within some allowed error value, then the location of the given infrared LED is associated with the same object ID corresponding to the acceleration data from the tracking unit 104. The object identification module 114 then returns the position of the infrared LED 126 and the associated object ID to the camera motion capture module 112. In another approach for identifying objects associated with the infrared LEDs 126, as described above, the camera motion capture module 112 is able to detect strobe patterns. In addition to using strobe patterns to distinguish non-tracking lights from tracking lights, the strobe patterns can also be used to identify one object from another object. For example, the position and strobe pattern of a certain LED is sent to the object identification module 114. The object identification module 114 holds a database (not shown) of object IDs and their corresponding strobe patterns. The module 114 is able to receive object IDs and strobe patterns from the tracking units 104, via the receiver 108. The object identification module 114 receives the position and strobe pattern from the camera motion capture module 112 and identifies the corresponding object ID based on matching the imaged strobe pattern with known strobe patterns in the database. When a match is found, the position and object ID are sent back to the camera motion capture module 112.

The above approaches for tracking and identifying multiple tracking units 104 and objects can be combined in various ways, or used in alternative to one another. It can be appreciated that the object identification module 114 can also directly output the positions of the infrared LEDs 126 to the state machine 300.

As mentioned earlier, the object ID, angular orientation and inertial acceleration data can be sent by a tracking unit 104 and received by the receiver 108. Preferably, the object ID is included with IMU data, whereby the object ID is associated with the IMU data.

The state machine 300 receives the position and associated object ID from the camera motion module 112 or the object identification module 114. The state machine 300 also receives the IMU data (e.g. acceleration, angular orientation, true north heading, etc.) from the receiver 108. The state machine 300 uses these measurements to update the state models. In one example, the state machine 300 uses a particle filter to update the state models. Examples of such particle filters include the Kalman filter and extended Kalman filter, which are known algorithms for estimating a system's varying quantities (e.g. its position and angular orientation state) using control inputs and measurements. In the proposed systems and methods, the measurement data is gathered from the cameras 100 and IMU 130.

An example of data components in the state machine 300 is shown in FIG. 8. Associated with each object ID 316 is a previous state 318, measurement data 320, and a current state 322. The current state 322 is determined by the measurement data 320 and the previous state 318. Upon determining the current state 322, the current state 322 becomes the previous state 318 in order to calculate the next current state 322. In other words, the current state 322 is updated in a recursive manner.

By way of background, noisy sensor data, approximations in the equations that describe how a system changes, and external factors that are not accounted for introduce some uncertainty about the inferred values for a system's state. When using the Kalman filter, the state machine 300 averages a prediction of a system's state with a new measurement using a weighted average. The purpose of the weights is that values with better (i.e., smaller) estimated uncertainty are "trusted" more. The weights are calculated from the covariance, a measure of the estimated uncertainty of the prediction of the system's state. The result of the weighted average is a new state estimate that lies in between the predicted and measured state, and has a better estimated uncertainty than either alone. This process is repeated every step, with the new estimate and its covariance informing the prediction used in the following iteration. This means that the Kalman filter works recursively and requires only the last "best guess"—not the entire history—of a system's state to calculate a new state. When performing the actual calculations for the filter, the state estimate and covariances are coded into matrices to handle the multiple dimensions involved in a single set of calculations. This allows for representation of linear relationships between different state variables (such as position, velocity, and acceleration) in any of the transition models or covariances.

Particle filters, such as Kalman filters and extended Kalman filters, are able to update a state (e.g. the position and angular orientation) at any time upon receiving measurements. In other words, the receipt of the position measurements and the angular orientation measurements do not need to be synchronized, and the measurements can be received by the state machine 300 in any order. For example, the state machine 300 can receive position data more often than angular orientation data for a particular object, and the state of that particular object will be updated as the new measurements are received. This allows for the state machine 300 to update the objects' states at the fastest speed possible, even if IMU 130 has a slower data-gathering rate compared to the camera motion capture module 112. The particle filters are also versatile as they are able to update the state of an object using different types of data. For example, although the camera motion capture module 112 may not be able to provide position data at times because the light sources 126 are occluded or blocked from the cameras' view, the state machine 300 can receive acceleration data from the tracking unit 104 through the receiver 108. Based on the last known position or state of the object and the acceleration information, the state machine 300 can calculate the new position. In this way, various types of data can be used to generate an updated state (e.g. position and angular orientation).

It will be appreciated that other types of particle filtering algorithms can be used. More generally, algorithms used for updating an object's state (e.g. position and angular orientation) using measurements are applicable to the principles described herein.

Turning back to FIG. 6, the output of information from the tracking engine 106 can be very fast, for example at 50 Hz or more. The data response rate can, for example, be maintained by prioritizing the data. For example, the data prioritizing module 120 can prioritize the gathering of positional data over the angular orientation data, so that the positional data is accurate all the time, while the angular orientation data may be updated although with some delay. Additionally, to conserve computing resources, when computing the position when light sources 126 are occluded, the processing of camera images can be delayed. In particular, when using the inertial positioning data, the camera images are not relied upon to determine the position of the LED and, thus, there is no need to process the camera images as quickly.

It can be appreciated that the tracking engine 106 outputs both position information (e.g. X, Y, Z coordinates) and orientation information (e.g. roll, pitch, yaw) associated with an object, or an object ID where there are many objects being simultaneously tracked. The tracking engine 106 also includes a time stamp associated with such information. The outputs of the tracking engine 106 are stored in the tracking database 236. Further details about the tracking engine 106 and tracking unit 104 are provided in U.S. patent application Ser. No. 12/872,956, the contents of which are herein incorporated by reference in its entirety. An example embodiment of the tracking system described with respect to FIG. 6 to FIG. 8 is commercially available under the trade-mark BlackTrax by CAST Group of Companies Inc.

As described earlier, the tracking unit 104 and tracking engine 106 are examples of tracking systems and tracking devices that can be used to obtain the position information, orientation information, time information, etc. of an object. Notably, other tracking systems and tracking devices can be used.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer or processor readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the RTM 24, 3D sound module 240, tracking devices, tracking engine 106, tracking unit 104, etc. or accessible or connectable thereto. Any application or module herein described may be implemented using computer or processor readable/executable instructions or operations that may be stored or otherwise held by such computer readable media.

Figure 9:
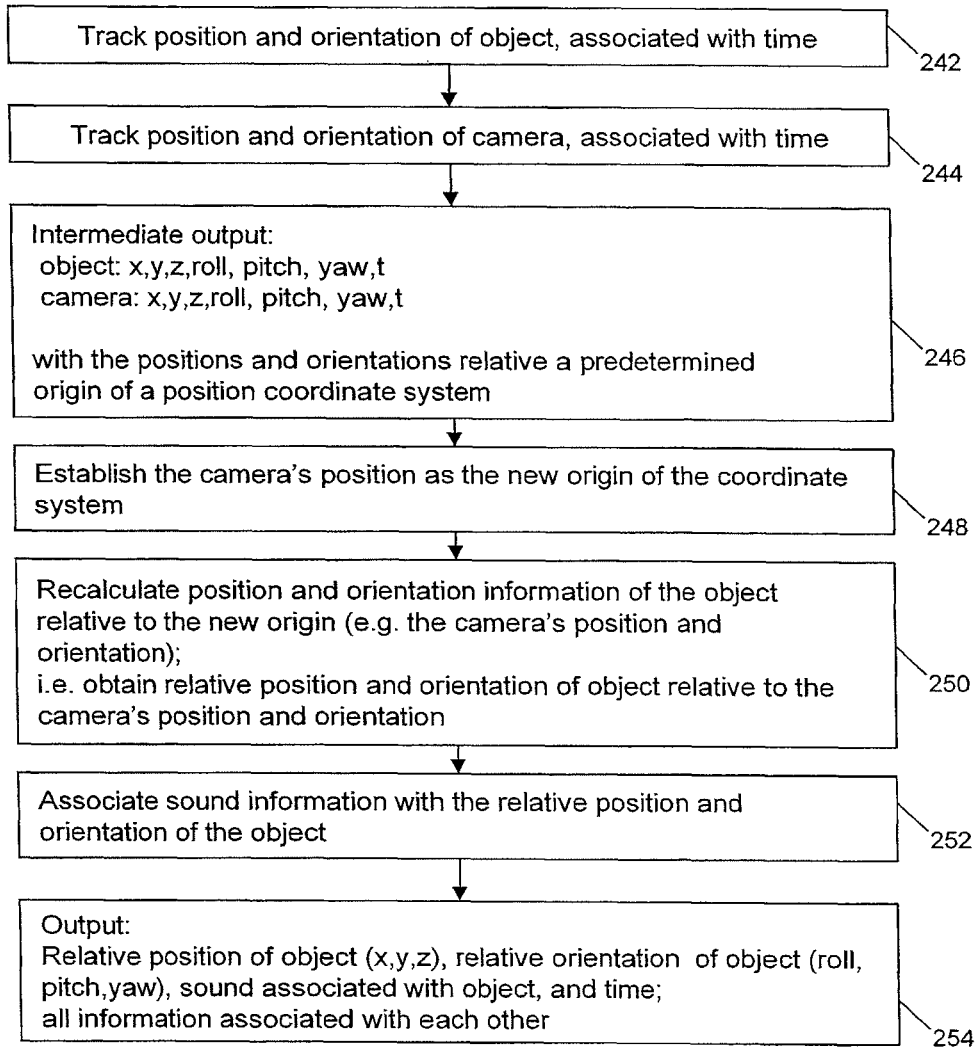
FIG. 9 is a flow diagram illustrating example computer executable instructions for associating position information of an object with sound information.

Turning to FIG. 9, example computer or processor executable instructions are provided for associating sound information with position information and orientation information of an object (e.g. a physical object). The instructions are applicable, for example, to the system shown in FIG. 3. At block 242, the position and orientation of an object are tracked and are associated with time. At block 244, the position and orientation of a camera are tracked and are associated with time. At block 246, the intermediate output is a series of x, y, z coordinates; roll, pitch, yaw angles; and time stamps for the object and the camera. The positions and orientations are relative to a predetermined origin of a position coordinate system.

At block 248, the camera's position is established as the new origin of the coordinate system. At block 250, the position and the orientation of the object are recalculated relative to the new origin, based on the camera's position and orientation. In other words, the 3D sound module 240 can use kinematics to determine the relative position (and orientation) of the object relative to the camera's position.

At block 252, sound information from the sound database 238 is associated with the relative position and relative orientation of the object. At block 254, the output is at least the relative position of the object and the sound associated with the object. Additionally, the output can include the relative orientation of the object and a time stamp. This information is stored in memory in association with each other.

Figure 10:
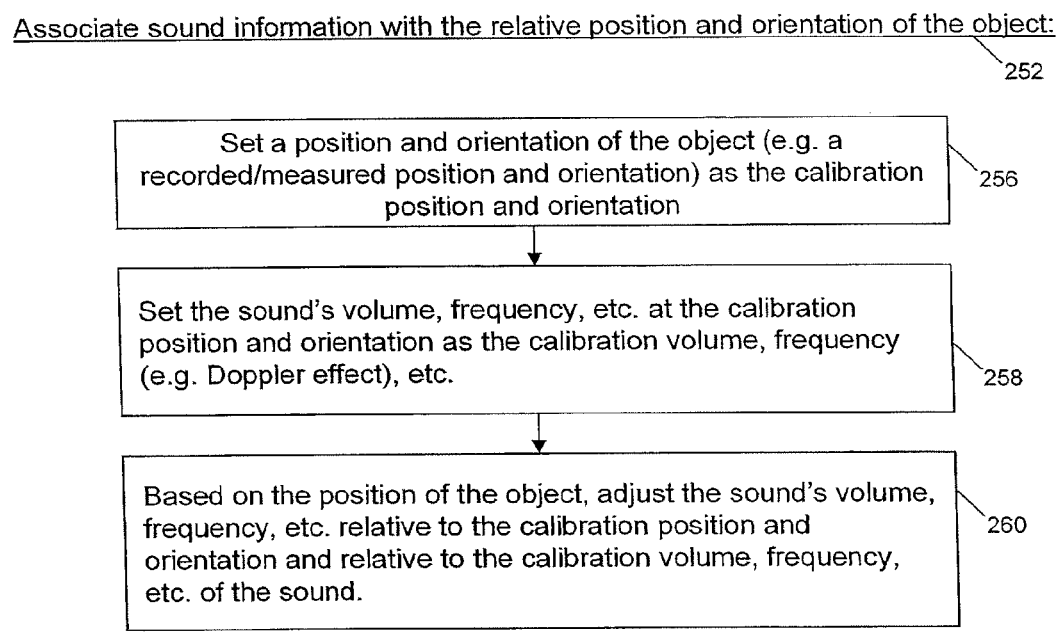
FIG. 10 is a flow diagram illustrating example computer executable instructions for associating and adjusting sound information based on the relative position of an object to a camera.

FIG. 10 provides further computer or processor executable instructions for performing block 252. In particular, to associate sound information with a relative position of the object, at block 256, a position and orientation at a point in time (that has been recorded or measured using a tracking device) is selected as a calibration position and orientation, respectively. The sound's volume, frequency, etc. at the calibration position and orientation is set as the calibration volume, frequency, etc. (block 258). It can be appreciated that other sound characteristics, in addition to volume and frequency, can be adjusted. Based on the position of the object, the sound's volume, frequency, etc. are adjusted relative to the calibration position and orientation and relative to the calibration volume, frequency, etc. of the sound.

For example, sound volume can decay over distance. If the noise source is outdoors and its dimensions are small compared with the distance to the monitoring position (ideally a point source), then as the sound energy is radiated it will spread over an area which is proportional to the square of the distance. This is an 'inverse square law' where the sound level will decline by 6 dB for each doubling of distance.

In another example scenario, line noise sources such as a long line of moving traffic will radiate noise in cylindrical pattern, so that the area covered by the sound energy spread is directly proportional to the distance and the sound will decline by 3 dB per doubling of distance.

In another example embodiment, the received sound frequency is higher (compared to the emitted frequency) as the sound source approaches a listener; it is identical at the instant of passing by; and it is lower as the sound source moves away from the listener. This behaviour in frequency is called the Doppler effect and, in an example embodiment, it is used to adjust the sound frequency when performing the methods described herein.

In general, various sound models can be used to adjust the different characteristics of the sound using the position and orientation information.

Importantly, if there are multiple cameras capturing an image of an object (as per FIG. 3), then the instructions and operations of FIG. 9 and FIG. 10 are applicable to each camera. In this way, from the perspective of each camera, the sound information can be associated with the object. It is recognized, for example, that the sound as perceived from the position of camera A 226 and the position of camera N 230 is different for a same point in time. Such an effect is explained with FIGS. 11, 12, 13.

Figure 11:
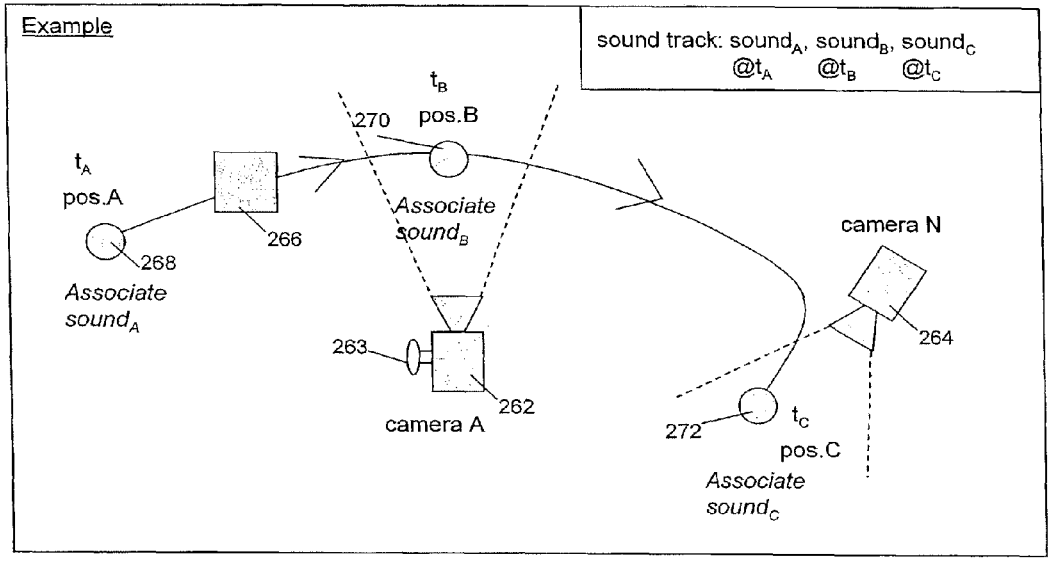
FIG. 11 is schematic diagram illustrating an example scenario in which an object moves relative to two cameras and sound is associated with the different positions of the object.

FIG. 11 shows an object 266 moving from position A 268 (at time $t_A$), to position B 270 (at time $t_B$), to position C 272 (at time $t_C$). Camera A 262 is positioned to capture images of the object 266 in position B 270 and camera N 264 is positioned to capture images of the object 266 in position C 272. A sound track is associated with the object's location based on the timing. The sound track is formed from of a collection of sounds corresponding to different times. For example: $sound_A$ corresponds to $t_A$; $sound_B$ corresponds to $t_B$; and $sound_C$ corresponds to $t_C$. Therefore, based on the timing, $sound_A$ is associated with the position and orientation information of the object 266 at position A 268. Similarly, $sound_B$ is associated with the object's information at positon B and $sound_C$ is associated with the object's information at position C.

Figure 12:
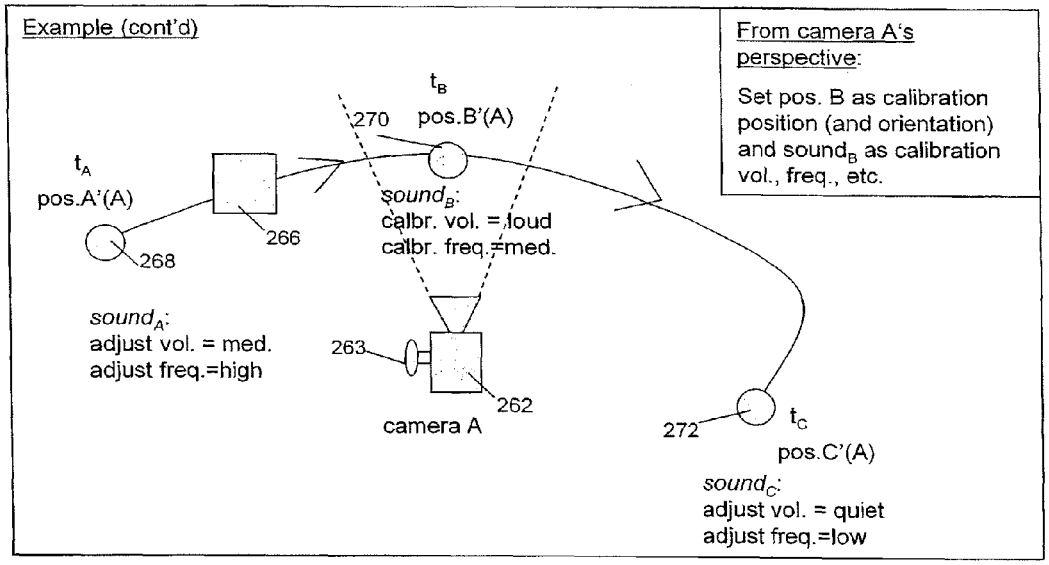
FIG. 12 is a schematic diagram continued from FIG. 11 illustrating how volume and frequency are adjusted from the perspective of one of the cameras.

Continued from the scenario of FIG. 11, FIG. 12 illustrates how the sound is adjusted based on the relative position of the object, that is relative to camera A 262. The relative positions and orientations of the object 266 are represented with new values which are based on establishing camera A's position as the new origin in a position coordinate system and recalculating the position coordinates and orientation angles of the object relative to the new origin. The new values are symbolically represented as pos.A'(A), pos.B'(A), and pos.C'(A), where the "(A)" represents that the values are relative to camera A 262.

The adjustment of sound also changes when the object's position is perceived from a different camera. For example, in FIG. 12, position B, now position B'(A), 270 is set as the calibration position and calibration orientation. $Sound_B$, which is associated with position B'(A), and its characteristics (e.g. volume, frequency, etc.) are set as the calibration sound characteristics. Sound$_B$ has a loud calibration volume and medium calibration frequency, from the perspective of camera A 262. In an example embodiment, sound is further adjusted, and this is akin to adjusting the calibration setting. As discussed below, the sound characteristics of other positions will be automatically computed based in part on the calibration setting (e.g. sound characteristics of sound$_B$).

In another example embodiment, a microphone 263, as shown in FIG. 11 and FIG. 12, is positioned at the same location as camera A 262, and the sound recorded from the microphone 263 is used to determine the calibration volume and calibration frequency of sound$_B$. In particular, the volume and frequency of the sound recorded by the microphone 263 at time tB are the calibration volume and calibration frequency. The sound characteristics at the other positions are then computed relative to the calibration volume and calibration frequency, which are from the perspective of camera A 262.

In particular, continuing with FIG. 12, based on the calibration position 270 and the calibration sound characteristics, at pos.A'(A), the volume is adjusted to be "medium" and the frequency is adjusted to be "high". Volume and frequency models can be used, which generally dictate sound volume is quieter as the distance increases and sound frequency is higher as the source of the sound (e.g. the object 266) moves in a direction towards the person or device listening to the sound. The listening person or device is considered to be camera A 262. Using such principles, at pos.C'(A), the object 266 is at some distance moving away from camera A 262 and therefore, the volume of sound$_C$ is adjusted to be "quiet" and the frequency of sound$_C$ is adjusted to be "low".

Figure 13:
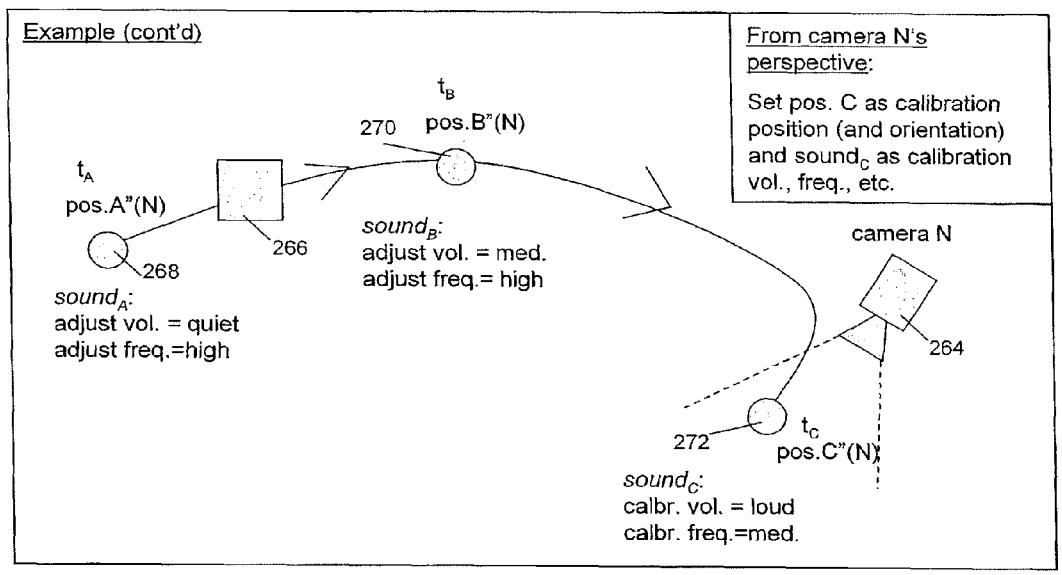
FIG. 13 is a schematic diagram continued from FIG. 11 illustrating how volume and frequency are adjusted from the perspective of another of the cameras.

From another camera perspective continued from the scenario of FIG. 11, FIG. 13 illustrates the adjustment of sound relative to camera N 264. The new position and orientation values are represented as pos.A"(N), pos.B"(N) and pos.C"(N), since the values are recalculated with the position and orientation of camera N 264 being the origin of the new position coordinate system. Pos.C"(N) is set as the calibration position and orientation. Sound$_C$'s volume and frequency values are loud and medium, respectively, and these values are set at calibration points. Using sound models for volume and frequency, the volume of sound$_B$ at pos.B"(N) is adjusted to a medium value (e.g. quieter than the calibration volume) and the frequency is adjusted to a high value (e.g. higher than the calibration frequency). At pos.A"(N), sound$_C$'s volume is adjusted to be quiet (e.g. quieter than the adjusted volume of sound$_B$) and sound$_C$'s frequency is adjusted to be high.

In another example embodiment, although not shown in FIG. 11 and FIG. 13, there is a microphone located at the same position as camera N 264 and the sound it records at the time tc is used as the calibration setting (e.g. for volume and frequency). The sounds at the other positions (e.g. pos.A"(N), pos.B"(N)) are calibrated using the calibration setting, which results in a sound track relative to camera N's perspective.

Figure 14:
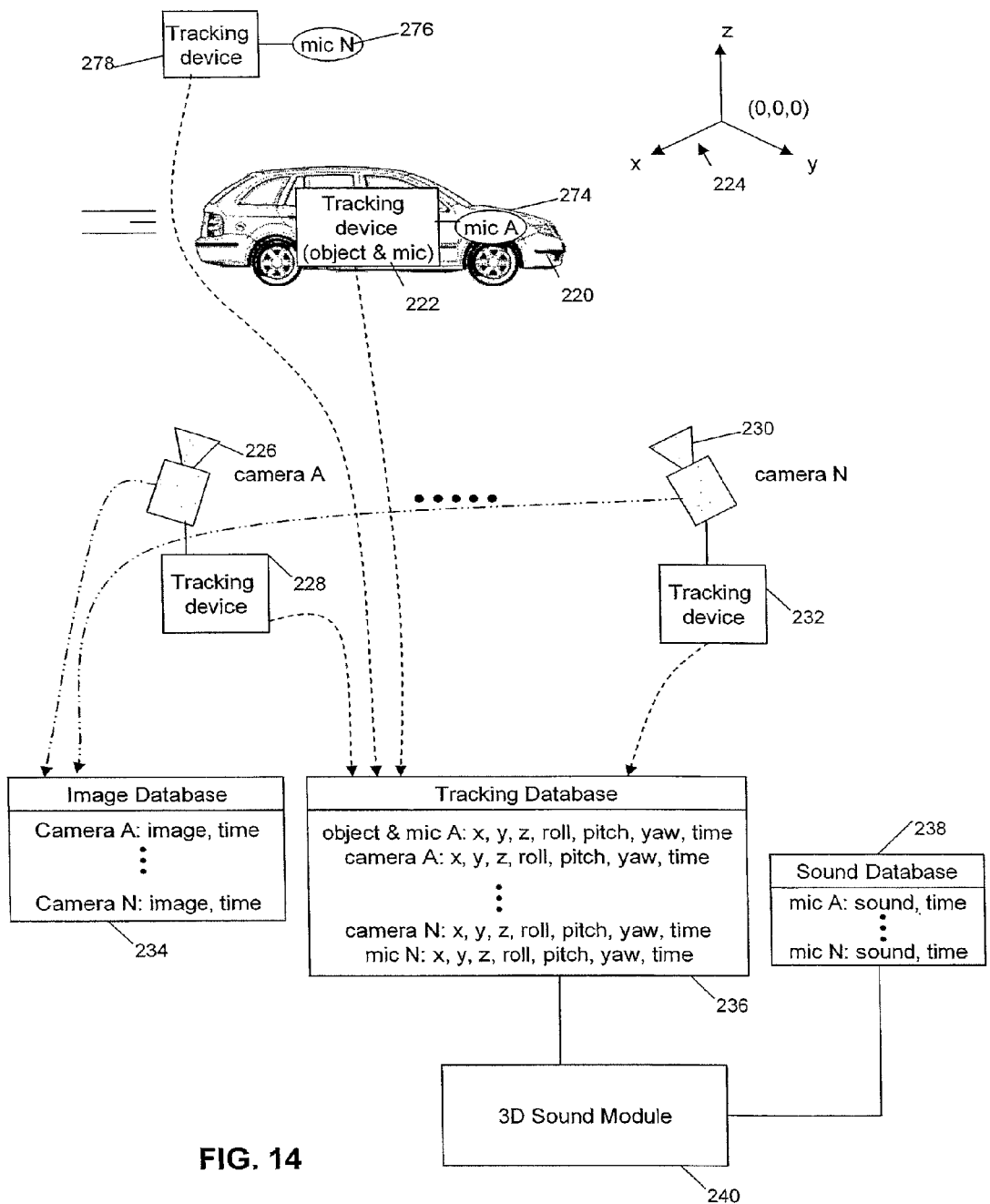
FIG. 14 is a system diagram illustrating example components for tracking position and orientation of an object, a camera, and a microphone, and for associating recorded sound information with the position of the object.

Turning to FIG. 14, an example embodiment of a system is provided for associating position and orientation information of an object with sound recorded from one or more microphones. The position and orientation of a microphone are considered, since the sound recorded by a microphone depends on a microphone's relative position and orientation relative to the sound source. The system of FIG. 14 is similar to the system of FIG. 3. A notable difference is that microphone A 274 and microphone N 276 are used to record the sound produced by the moving car 220. Microphone A 274 is attached to the car 220 and the microphone's position and orientation information can be tracked using the same tracking device 222 used to track the car 220. Microphone N 276 can be stationary or can be mobile, for example attached to a chase helicopter 23a. Tracking device 278 obtains the position information and the orientation information of microphone N 276. The sounds recorded from the microphones 274, 276 are stored in the sound database 238 and are associated with time information, such as time stamps. The position and orientation information of the microphones 274, 276 are stored in the tracking database 236.

In general, to associate the position information and sound, the position information of an object, the car 220, is obtained for a given time or point in time. The position information of a camera and a microphone are also obtained for the same given time. The sound information associated with the object, and recorded from the microphone, is obtained. Then a relative position of the object relative to the camera's position is determined. The sound module 240 also determines the relative position of the microphone relative to the object's position. The sound module 240 then generates calibrated sound information using the sound information and the relative position of the microphone. The sound module 240 then associates the calibrated sound information with the relative position of the object.

Figure 15:
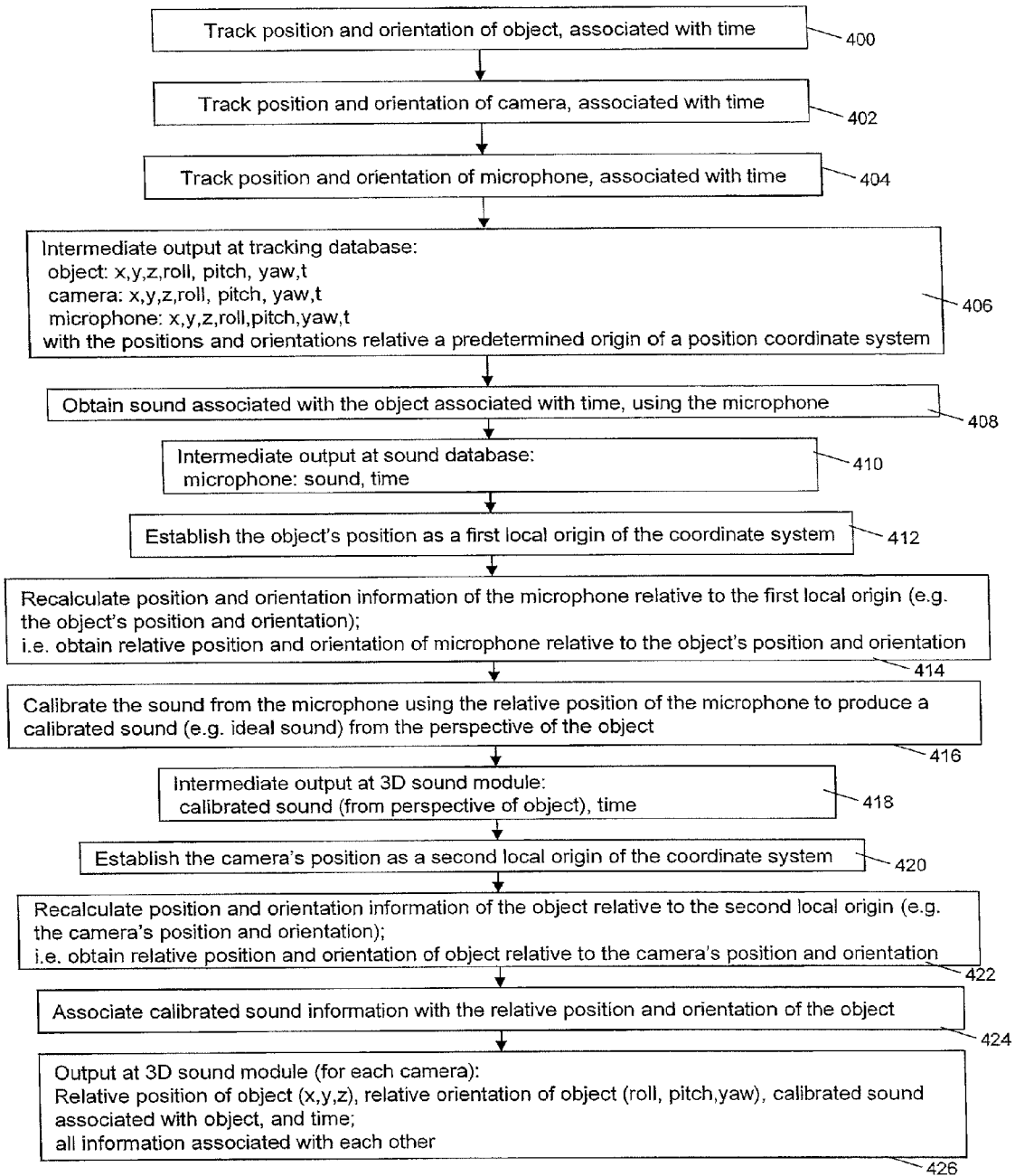
FIG. 15 is a flow diagram illustrating example computer executable instructions for associating sound information recorded from a microphone with the position and orientation of an object.

FIG. 15 provides example computer or processor executable instructions for associating position information and orientation information with sound. The instructions are suitable for a particular combination of an object, camera and microphone corresponding to the same point in time. The relative positioning and orientation, and thus the adjusted sound information, tend to vary when using a different combinations of an object, camera and microphone, and can also vary according to different points in time if any of the object, camera and microphone are moving. It is therefore appreciated that the instructions of FIG. 15 are executed for each particular combination at each point in time.

At block 400, the position and orientation of an object are tracked and associated with time or a time stamp. Similarly, at blocks 402 and 404, the positions and orientations of the camera and of the microphone are tracked and are associated with time or a time stamp. Block 406 shows in intermediate output of the collected data stored in the tracking database 236. The position coordinates x,y,z, the orientation angles roll,pitch,yaw and the associated time stamps for each of the object, camera and microphone are stored.

At block 408, the sound associated with the object is obtained. In particular, the sound, as recorded from the microphone, is obtained for the same point in time as the time of the positions and orientations. At the sound database 238, the intermediate output associated with the particular microphone is the sound at the given time (block 410).

At block 412, the object's position is established as a first local origin of the coordinate system. At block 414, the position and orientation information of the microphone are calculated relative to the first local origin (e.g. the object's position and orientation); this provides the relative position and relative orientation of the microphone. At block 416, the sound from the microphone is calibrated using the relative position of the microphone to produce a calibrated sound or ideal sound from the position or perspective of the object. The intermediate output of the 3D sound module 240 is the calibrated sound from the perspective of the object, as well as the associated time stamp (block 418).

The purpose of this calibration is to produce a sound that is consistent and ideal, as if a listening device or a person were moving at a constant position and orientation relative to the object. It is recognized that if the object is moving in one direction, the camera is moving in another direction, and the microphone is moving in yet another direction, then the sound of the object recorded from the microphone may not match the sound perceived as if listening from the position or perspective of the camera. The calibrated sound addresses such an issue.

At block 420, the camera's position is established as a second local origin of the coordinate system. At block 422, the position and orientation information of the object relative to the second local origin (e.g. the camera's position and orientation) is calculated. This provides the relative position and orientation of the object, that is relative to the camera's position and orientation. At block 424, the calibrated sound information is associated with the relative position and orientation of the object with respect to the second local origin. Associating the calibrated sound information with the relative position and orientation of the object can include adjusting the sound, such as volume and frequency, using sound models. The instructions of FIG. 10 can be used here to adjust the calibrated sound information according to the relative position and orientation of the object to the camera. At block 426, the output of the 3D sound module 240 includes the relative position of the object (e.g. x,y,z coordinates), the relative orientation of the object (e.g. roll, pitch, yaw), the calibrated sound, or the adjusted calibrated sound of the object, and the time stamp common to the position, orientation, and sound information. These groups of data are stored in memory in association with each other.

The data of block 426 is relative to the second local origin. It can be appreciated that if there are multiple cameras, then there would be multiple second local origins, each second local origin corresponding to a location of a respective camera. For each second local origin, blocks 420, 422, 424, 426 would be executed to produce the positioning, orientation and sound data relative to each camera.

Figure 16:
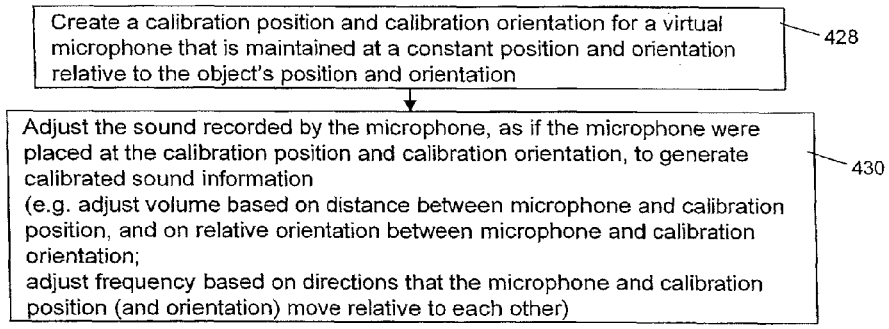
FIG. 16 is a flow diagram illustrating computer executable instructions for calibrating the originally recorded sound according to the perspective of the object.

Turning to FIG. 16, example computer or processor executable instructions are provided for calibrating the sound from the microphone using the relative position of the microphone (block 416). In particular, at block 428, a calibration position and a calibration orientation are created for a virtual microphone. A virtual microphone herein refers to a virtual listening or audio recording device that can be placed in a virtual environment, in some cases, representing a physical environment. The calibration position and orientation of the virtual microphone are maintained at a constant position and orientation relative to the object's position and orientation.

At block 430, the original sound recorded by the microphone is adjusted to produce the effect as if the microphone were placed at the calibration position and calibration orientation. This generates calibrated sound information that is ideal or constant. For example, even though the actual microphone may be located far away from a moving object and may be turned to face away from the moving object, the volume and the frequency of the recorded sound is calibrated to produce a sound that seems to have been recorded as if the microphone were nearby and facing towards the moving object.

Figure 17:
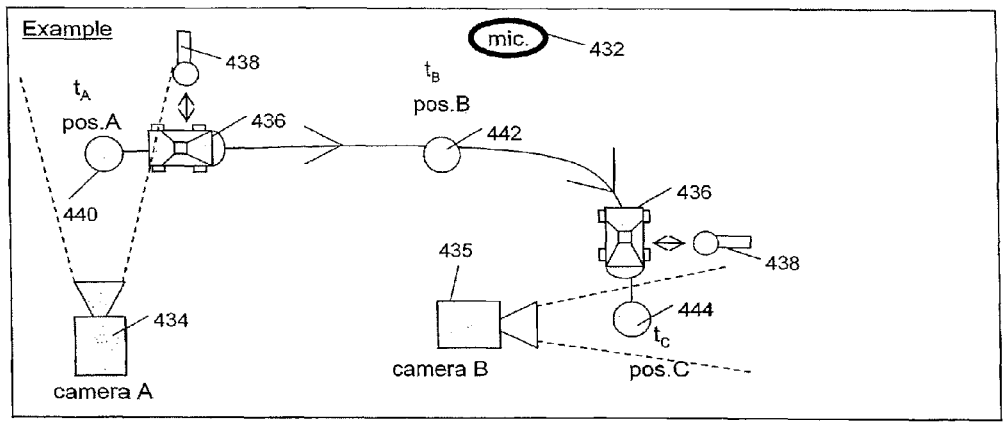
FIG. 17 is a schematic diagram of an example scenario of a car moving around a camera and a microphone recording the car's sounds.
Figure 18:
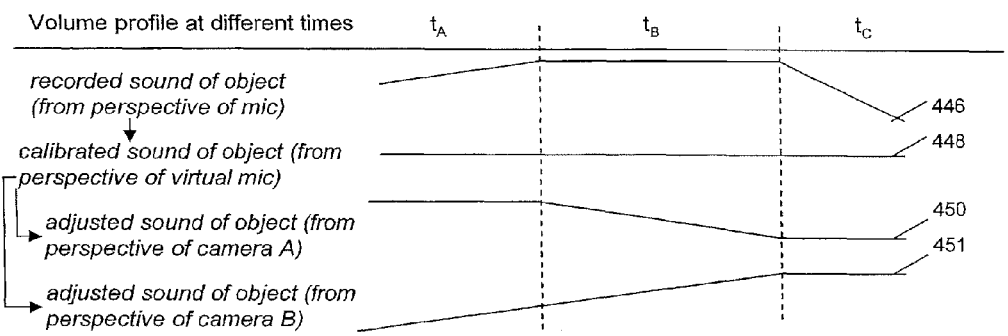
FIG. 18 is an example schematic diagram corresponding to FIG. 17 of different volume profiles over time obtained from different perspectives.

FIG. 17 and FIG. 18 illustrate an example embodiment to explain the calibration of sound relative to the position and orientation of an object and the adjustment of the sound relative the position and orientation of a camera.

In FIG. 17, camera A 434, camera B 435, and a microphone 432 are in fixed positions as they record images and sounds of the moving car 436 from position A 440, position B 442, and position C 444. The placement of the calibration position and calibration orientation of a virtual microphone 438 is a short distance to the left of the object, with the virtual microphone 438 facing the car 436. Therefore, even as the car 436 turns, the relative position and orientation of the virtual microphone 438 remain the same. Camera A 434 is positioned near or facing position A 440. Camera B 435 is positioned near or facing position C 444.

Considering FIG. 18, volume profiles are provided at different times $t_A$, $t_B$, $t_C$ corresponding to the different positions 440, 442, 444. Although volume is considered here by way of example, other sound characteristics (e.g. frequency) can also be calibrated and then adjusted. The volume profiles 446, 448, 450, 451 also correspond respectively to the originally recorded sound of the object from the perspective of the microphone 432, the calibrated sound from the perspective of the virtual microphone 438, and the adjusted sound from the perspectives of camera A 434 and camera B 435.

The volume profile 446 increases from $t_A$ as the car 436 moves closer towards the microphone 432. The recorded sound is loudest at $t_B$ when the car 436 is closest to the microphone 432. As the car 436 moves away from the microphone 432 at $t_C$, the volume decreases.

The volume profile 446 is calibrated according to a calibration position and orientation of the virtual microphone 438, kept constant relative to the car 436. If the car 436 is making a sound with constant volume, then the calibrated volume profile 448 for the different times is constant. This volume profile 448 is considered to be ideal, given the constant proximity to the object 436.

The calibrated volume profile 448 of the car 436 is then adjusted to account for the relative position and orientation of the car 436, that is relative to camera A 434. At $t_A$, the car 436 is in front of camera A 434 and is at an approximately constant distance away from camera A 436. Thus, the volume of the calibrated sound is at its loudest and generally remains constant. At $t_B$, or a small time period thereabout, the distance between the car 436 and camera A 434 increases, and thus the volume decreases. At $t_C$, the car 436 makes a turn and when doing so, the distance between the car 436 and camera A 434 remains approximately constant. Thus, the volume at $t_C$ remains approximately constant at a lower volume level compared to the time $t_A$. It can therefore be seen that the adjusted sound profile 450 is derived from the calibrated sound profile 448, which in turn is derived from the originally recorded sound profile 446.

Similarly, the calibrated volume profile 448 of the car 436 is adjusted to account for the relative position and orientation of the car 436 that is relative to camera B 435. As will be discussed below, the computed sound of the object to be perceived from camera B 435 is different from the computed sound to be perceived from camera A 434. At $t_A$, the car 436 is located at a distance away from camera B 435 and it is approaching or travelling towards camera B 435. Thus, the volume at $t_A$ is low and gradually increases. Similarly, at $t_B$, the car 436 continues to travel towards camera B 435 and the volume at this time, or time period thereabout, continues to gradually increase. At time $t_C$, the car 436 is located closer to camera B 435 and maintains a relatively constant distance to camera B. Therefore, the volume at time $t_C$ is approximately constant. The adjusted sound profile 451, from the perspective of camera B 435, is derived from the calibrated sound profile 448, which in turn is derived from the originally recorded sound profile 446.

Associating sound information with position information of an object has many applications. For example, a judge may be listening to several people speaking at once within a room and it can be difficult to determine who has presented the different ideas. The above described system can be used to track people's position and orientation and record the conversations. A camera is used to record the conversation (e.g. the sound information). Using the above proposed systems and methods, the speech made by different people can be attributed to each person's position. Thus, the judge is able to identify which person has spoken which words.

In another application, when producing movies, television, or games, when recording sound or images, or both, the above proposed systems and methods provide sound information associated with position and orientation information. Therefore, when generating the effects of 3D sound, such as described in FIG. 2A to FIG. 2D, the location of where to place the sound source is accurately known. This information is also automatically captured from the perspective of each of the one or more cameras, therefore increasing both efficiency and accuracy. The timing is also recorded, therefore also increasing the ease of syncing images and sound.

Moreover, the above proposed systems and methods automatically adjust or process the sound information to improve the realistic effect, as if the person were standing where a camera was positioned when recording. Sound characteristics, such as the volume and frequency, are adjusted based on their relative positioning and orientation between an object making the sound and the camera.

In another aspect of the proposed systems and methods, it is also recognized that positioning a microphone in three dimensional space relative to a camera can be difficult, especially when trying to avoid placing the microphone within the camera's viewing frustum. The viewing frustum is the 3D region of space in the physical world or virtual environment that may appear on the screen; it is the field of view of the notional camera. The exact shape of this 3D region varies depending on what kind of camera lens is being used, but typically it is a frustum of a rectangular pyramid (hence the name). The viewing frustum does not have any physical or visible demarcation and this makes it difficult for a microphone operator or technician to position the microphone without the microphone passing into the viewing frustum. If the microphone passes into the viewing frustum, then the camera image will record an image of the microphone. Typically, such images need to be deleted and the images recaptured again without the microphone. This process is time consuming and expensive.

Figure 19:
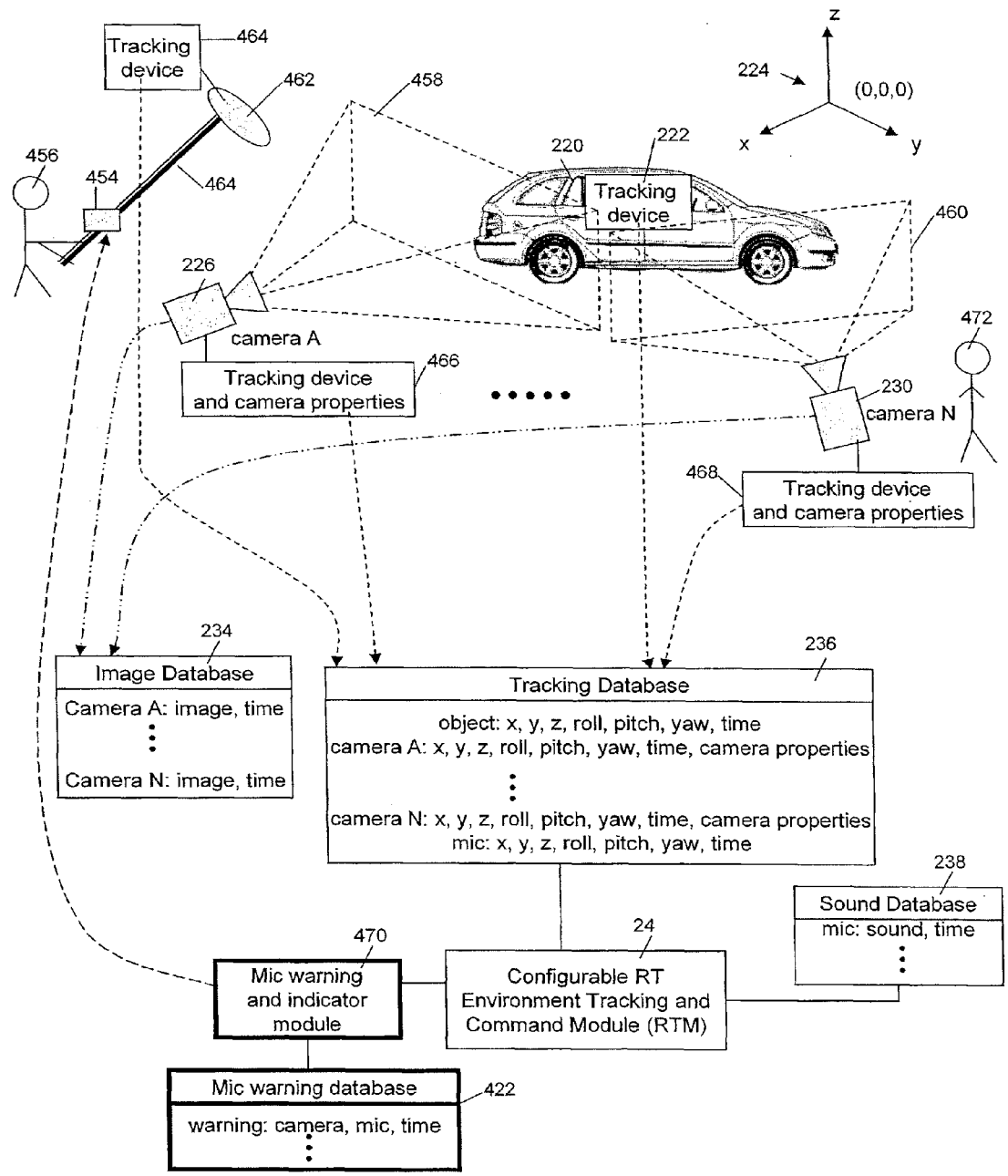
FIG. 19 is a system diagram illustrating example components for tracking the position of a microphone and for providing a warning when the microphone is positioned within the viewing frustum of a camera.

Turning to FIG. 19, a system is provided for tracking the position and orientation of a microphone 462 relative to camera A's viewing frustum 458 and camera N's viewing frustum 460. The microphone 462 is linked or associated with a tracking device 464, which is used to measure the position and orientation of the microphone 462. The microphone 452 is supported on a boom 452, which is controlled by a microphone operator or technician 454. A display device 454 is positioned before the operator 454 to provide warnings or indications regarding the microphone's position. The display device 454 can be located on the boom 452. Camera A 226 is associated with the tracking device 466, which tracks camera A's position and orientation as well as camera properties. Examples of camera properties include lens information, focal length, zoom, field of view, depth of field, etc. The camera properties are used to determine the dimensions of the viewing frustum 458. The position and orientation of the camera are used to determine the position of the viewing frustum 458. Similarly, camera N 230 is associated with a tracking device 468 that provides position information, orientation information, and camera properties used to determine the dimensions of the viewing frustum 460.

The tracked data (e.g. position coordinates, orientation angles, time, camera properties) is organized by the associated object, camera or microphone and is stored in the tracking database 236. As described earlier, the tracking database 236 is associated or part of the RTM 24. The RTM 24 monitors the spatial positions and orientations of the microphone 462 and the viewing frustums 458, 460 in a corresponding mathematical or virtual model, also called the virtual environment 4. The RTM 24 can obtain or determine one or more dimensions of a camera's viewing frustum in a three dimensional space using the camera properties and the position and orientation information of the camera 226.

If the position of the microphone 462 is within a camera's viewing frustum, as modeled in the virtual environment 4, then any number of actions can be taken. The time stamp at which the microphone 462 is within a viewing frustum is recorded and stored in the microphone warning database 422. A data entry in the database 422 includes an identification of the camera, an identification of the microphone that has overlapped the identified camera's viewing frustum, and the time stamp of when the overlap occurred. A warning is generated and sent to the operator 456, or an operator 472 of the camera 226, alerting that the microphone 462 is within the viewing frustum. The warning can be sent to the display device 454. Another response, if an overlap of the microphone 462 is detected, is providing an indication to the operator 456 through the display device 454 regarding which direction to move the microphone in a direction out of the camera's viewing frustum. The management of sending the warning and indicators, as well as recording the times of such overlapping occurrences, is performed by the microphone warning and indicator module 470. The module 470 is considered to be a client for the RTM 24.

Figure 20:
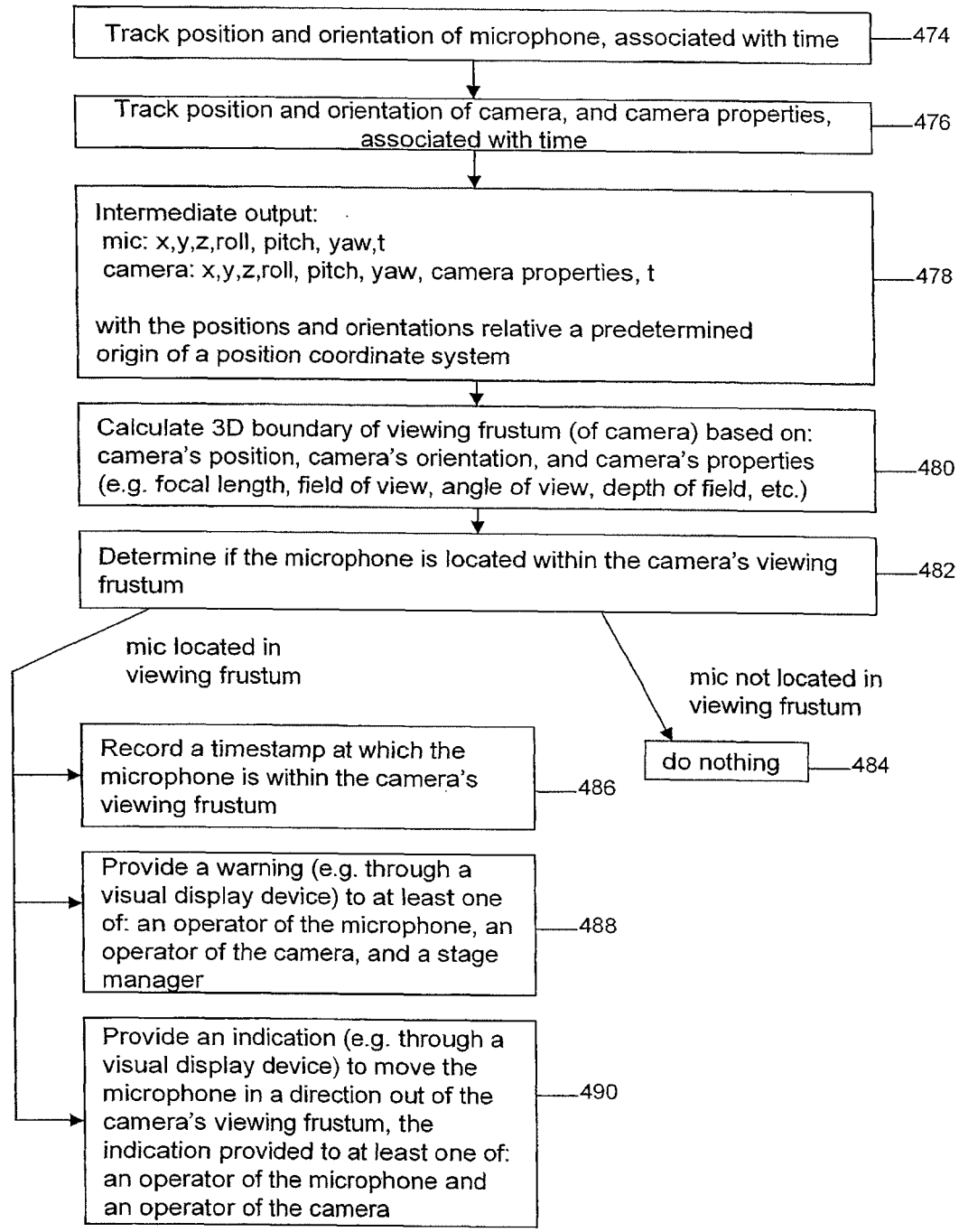
FIG. 20 is a flow diagram illustrating example computer executable instructions for tracking the position of a microphone relative to a viewing frustum of a camera and providing a warning or indication if the microphone is within the viewing frustum.

FIG. 20 provides example computer or processor executable instructions for tracking a microphone relative to a camera's viewing frustum. At block 474, the position and orientation of a microphone are tracked and associated with time. At block 476, the position and orientation of a camera, and the camera properties, are tracked in association with time. At block 478, the intermediate output collected at the tracking database 236, or the RTM 24, includes the x,y,z coordinates, roll, pitch, yaw, and time stamp of the microphone, and the x,y,z coordinates, roll, pitch, yaw, camera properties, and the same time stamp of the camera. At block 480. The 3D boundary of the viewing frustum is calculated in the virtual environment 4 based on: the camera's position, the camera's orientation, and the camera's properties (e.g. focal length, field of view, angle of view, depth of view, etc.). At block 482, based on coordinates of the microphone and the 3D boundary of the viewing frustum, it is determined if the microphone is located within the camera's viewing frustum. If not located within the viewing frustum, no action is taken (block 484). If so, any one or more of the following responses take place: record a time stamp at which the microphone is within the camera's viewing frustum (block 486); provide a warning (e.g. through the display device 454) to at least one of an operator 456 of the microphone, an operator 472 of the camera, and a stage manager (block 488); and provide an indication (e.g. through the display device 454) to move the microphone in a direction out of the camera's viewing frustum. Providing a time stamp allows a film editor or film director to conveniently locate the time portion of film or video that shows the microphone 462, and they can remove or edit that portion of video (e.g. edit out the appearance of the microphone 462).

Figure 21:
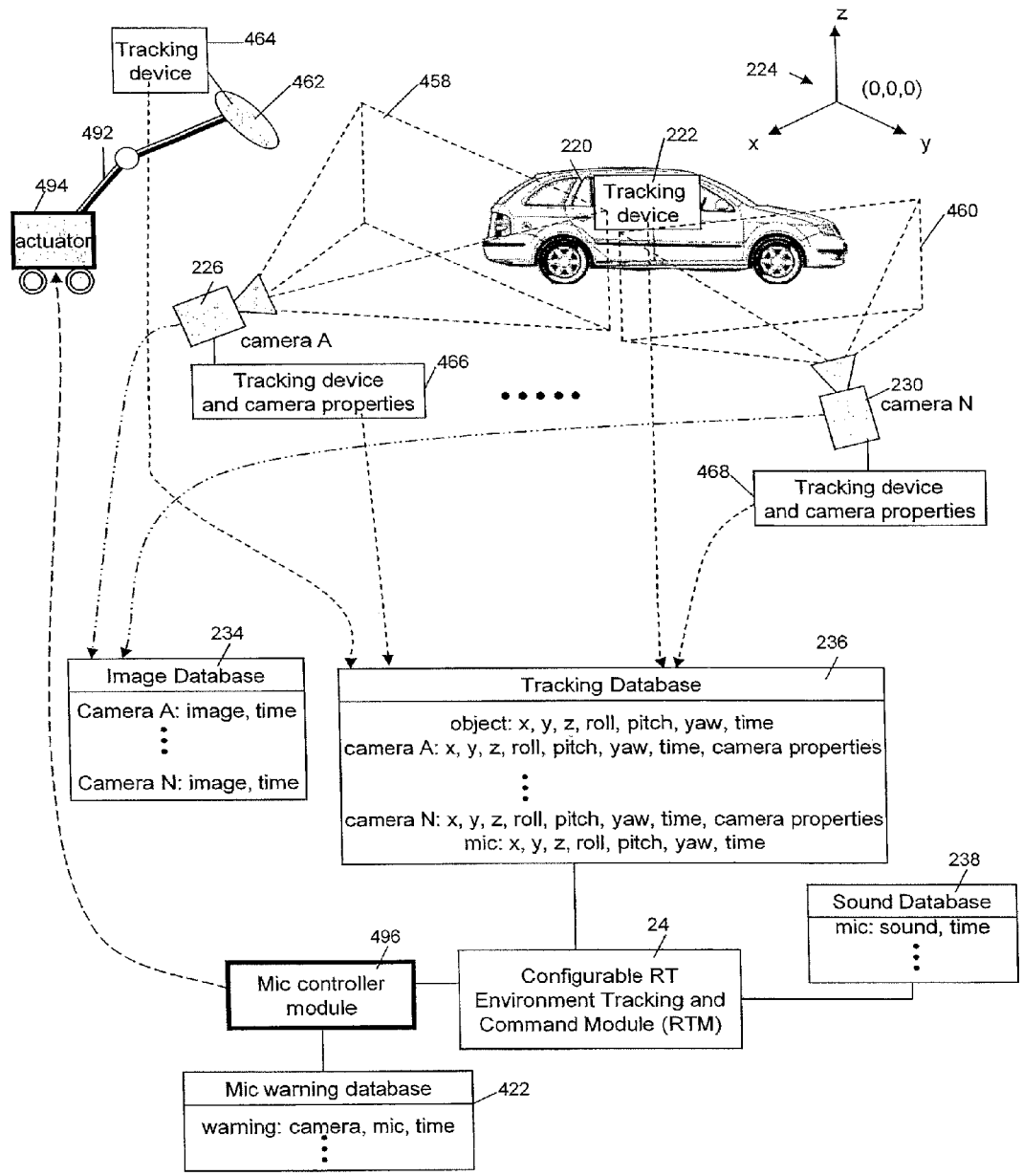
FIG. 21 is a system diagram illustrating example components for tracking the position of a microphone and for providing commands to ensure the microphone is moved or positioned outside the viewing frustum of a camera.

Turning to FIG. 21, an example system is provided for controlling a microphone 462 that is able to be automatically positioned by an actuator system 494. The actuator or actuator system 494 can use a robotic arm 492 or other means (e.g. wheels, pulleys, rails, helicopter, etc.) to position and orient the microphone 462. The system of FIG. 21 is similar to the system of FIG. 20. However, in place of, or in addition to the microphone warning and indicator module 470, there is a microphone controller module 496 which is in communication with the RTM 24. The controller module 496 is able to provide one or more commands to the actuator system 476 to prevent the microphone from being positioned within the viewing frustum 458 of camera A 226. The commands are issued based on obtaining the one or more dimensions of the viewing frustum of a camera in 3D space, and obtaining position information of the microphone. The combination of such information can be used as inputs for generating control commands. The controller module 496 may transmit commands to the actuator system 494 through wired or wireless communication means.

Figure 22:
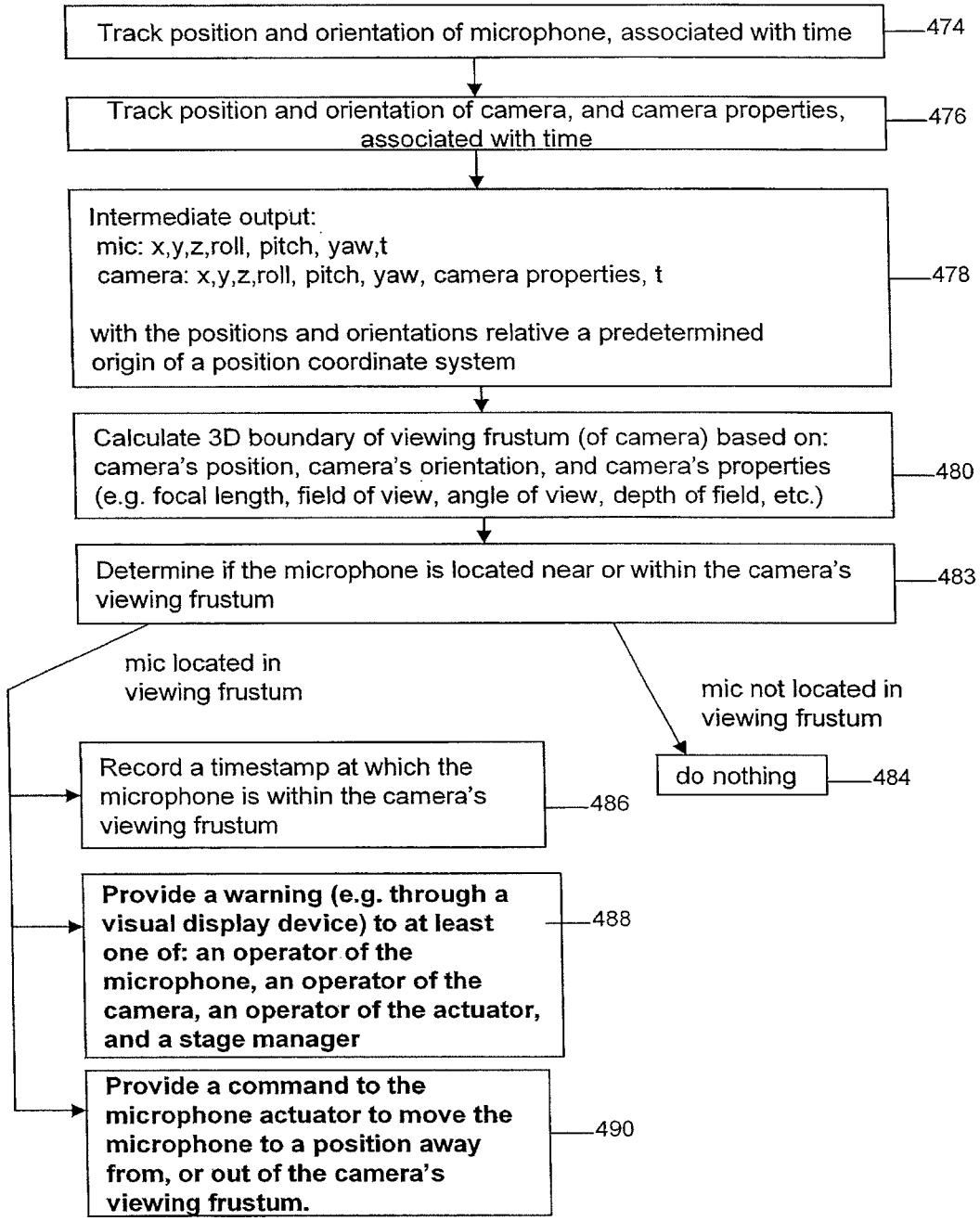
FIG. 22 is a flow diagram illustrating example computer executable instructions for tracking the position of a microphone relative to a viewing frustum of a camera and providing a commands to move the microphone outside the viewing frustum.

Turning to FIG. 22, example computer or processor executable instructions are provided for controlling the position of a microphone. The operations are similar to those of FIG. 20, namely blocks 474, 476, 478, and 480. Upon determining the 3D boundary of the viewing frustum, it is determined if the microphone is located very close or near the camera's viewing frustum, or within the viewing frustum (block 483). If so, at block 490, the controller module 496 provides a command to the actuator system 494 to move the microphone to a position away from, or out of, the camera's viewing frustum. In an example embodiment, if the conditions of block 483 are met, a warning is also provided to at least one of the operator of the microphone, the operator of the actuator system 494, the operator of the camera, and the stage manager.

Using the proposed systems and methods will reduce or prevent the risk of the microphone moving within the camera's viewing frustum.

It can be appreciated that the controller module 496 can also provide commands to the actuator system 494 to position and orient the microphone 462 to maintain a desired distance (e.g. constant distance) away from a moving object, subject to the rules and commands preventing the microphone 462 from moving within any of the viewing frustums 458, 460.

In general, an example method is provided for associating position information and sound, the method comprising: obtaining position information of an object at a given time; obtaining position information of a camera at the given time; determining a relative position of the object relative to the camera's position; and associating sound information with the relative position of the object.

In another example aspect, the method further comprises adjusting the sound information based on the relative position of the object. In another example aspect, the sound information comprises at least one of volume and frequency. In another example aspect, the position information of the object, the position information of the camera, and the relative position of the object comprise coordinates in a position coordinate system. In another example aspect, the relative position of the object is determined by: establishing the camera's position as a new origin in the position coordinate system; and calculating the position information of the object relative to the new origin. In another example aspect, the method further comprises: obtaining orientation information of the object at the given time; obtaining orientation information of the camera at the given time; determining a relative orientation of the object relative to the camera's orientation; and associating the sound information with the relative orientation of the object. In another example aspect, the orientation information of the object and the orientation information of the camera comprises at least one of roll, pitch and yaw. In another example aspect, the sound information is obtained from a sound database.

In general, an example method is provided for associating position information and sound, the method comprising: obtaining position information of an object at a given time; obtaining position information of a camera at the given time; obtaining position information of a microphone at the given time; obtaining sound information associated with the object at the given time using the microphone; determining a relative position of the object relative to the camera's position and a relative position of the microphone relative to the object's position; generating calibrated sound information using the sound information and the relative position of the microphone; and, associating the calibrated sound information with the relative position of the object.

In another example aspect, the method further comprises adjusting the calibrated sound information based on the relative position of the object. In another example aspect, the method further comprises adjusting the sound information based on the relative position of the object and on the relative position of the microphone. In another example aspect, the sound information is adjusted by: creating a calibration position and a calibration orientation for a virtual microphone that is maintained at a constant position and at a constant orientation relative to the object's position and orientation; adjusting the sound information recorded by the microphone to be at a volume as if the microphone were at the calibration position and the calibration orientation to generate calibrated sound information, the calibrated sound information associated with the position information of the object; and adjusting the calibrated sound information based on the relative position of the object to the camera's position. In another example aspect, an other microphone is located at the same position as the camera, the method further comprising adjusting the calibrated sound information to equal sound characteristics of other sound information recorded by the other microphone at the given time.

In general, an example method is provided for tracking a microphone relative to a camera's viewing frustum, the method comprising: obtaining one or more dimensions of a camera's viewing frustum in three-dimensional space; obtaining a position of a microphone; if the position of the microphone is within the camera's viewing frustum, then recording a timestamp at which the microphone is within the camera's viewing frustum.

In another example aspect, the method further comprises: after determining the position of the microphone is within the camera's viewing frustum, providing a warning to at least one of an operator of the microphone and an operator of the camera. In another example aspect, the method further comprises: providing a visual display device for the operator of the microphone; and after determining the position of the microphone is within the camera's viewing frustum, the visual display device displaying a warning that the microphone is within the camera's viewing frustum. In another example aspect, the method further comprises the visual display device displaying an indication to move the microphone in a direction out of the camera's viewing frustum.

In general, an example method is provided for generating one or more processor executable instructions for positioning a microphone, the microphone able to be automatically positioned by an actuator system, the method comprising: obtaining one or more dimensions of a viewing frustum of a camera in three-dimensional space; obtaining position information of the microphone; generating one or more processor executable instructions to position the microphone in a location outside the viewing frustum of the camera; and sending the one more processor executable instructions to the actuator system.

In another example aspect, the method further comprises obtaining position information of an object; and providing one or more commands to the actuator system to position the microphone within a given distance range from the object without the microphone being positioned within the viewing frustum of the camera.

Although the above has been described with reference to certain specific example embodiments, various modifications thereof will be apparent to those skilled in the art as outlined in the appended claims.

The invention claimed is:

1. A method of associating position information and sound, the method comprising:
   obtaining a first position information and a second position information of an object respectively at first and second given times;
   obtaining a first position information and a second position information of a camera respectively at the first and the second given times;
   obtaining a first position information and a second position information of a microphone respectively at the first and the second given times, the microphone positioned apart from the camera;
   obtaining a first sound information and a second sound information associated with the object respectively at the first and the second given times using the microphone;
   determining a change in relative position of the object relative to the camera between the first and the second given times;
   determining relative positioning of the microphone relative to the object for the first and the second given times;
   generating calibrated sound information corresponding to the first and the second given times using the first sound information, the second sound information and the relative positioning of the microphone, and wherein the calibrated sound information is generated to be as if a listener is placed at the object;
   changing at least one characteristic of the calibrated sound information from the first given time to the second given time, based on the change in the relative position of the object relative to the camera; and
   the changing comprising, responsive to determining that the object and the camera are moving closer together, increasing a volume of the calibrated sound information between the first and the second given times.

2. The method of claim 1 wherein the relative positioning of the microphone relative to the object changes from the first given time to the second given time.

3. The method of claim 1 wherein the
   relative positioning of the microphone to the object is constant from the first given time to the second given time.

4. The method of claim 1 wherein an other microphone is located at the same positioning as the camera, the method further comprising adjusting the calibrated sound information to equal sound characteristics of other sound information recorded by the other microphone.

5. The method of claim 1 wherein the at least one characteristic of the calibrated sound information further comprises frequency.

6. The method of claim 5 further comprising, responsive to determining that the object and the camera are moving closer together, increasing the frequency of the calibrated sound information between the first and the second given times.

7. The method of claim 1 wherein the camera has a same position between the first and the second given times, and the object moves relative to the camera.

8. The method of claim 1 wherein the object has a same position between the first and the second given times, and the camera moves relative to the object.

9. A computing system for associating position information and sound, the computing system comprising:
   a data receiver configured to:
      receive a first position information and a second position information of an object respectively at first and second given times;
      receive a first position information and a second position information of a camera respectively at the first and the second given times;
      receive a first position information and a second position information of a microphone respectively at the first and the second given times, the microphone positioned apart from the camera;
      receive a first sound information and a second sound information associated with the object respectively at the first and the second given times using the microphone;
   memory that stores the received information; and
   a processor configured to:
      determine a change in relative position of the object relative to the camera-between the first and the second given times;
      determine relative positioning of the microphone relative to the object for the first and the second given times;
      generate calibrated sound information corresponding to the first and the second given times using the first sound information, the second sound information and the relative positioning of the microphone, and wherein the calibrated sound information is generated to be as if a listener is placed at the object;
      change at least one characteristic of the calibrated sound information from the first given time to the second given time, based on the change in the relative position of the object relative to the camera; and
      the change comprising, responsive to determining that the object and the camera are moving closer together, increasing a volume of the calibrated sound information between the first and the second given times.

10. The computing system of claim 9 wherein another microphone is located at the same positioning as the camera, the processor is further configured to adjust the calibrated sound information to equal sound characteristics of other sound information recorded by the other microphone.

11. The computing system of claim 9 wherein the at least one characteristic of the calibrated sound information further comprises frequency.

12. The computing system of claim 11 wherein the processor is further configured to, responsive to determining that the object and the camera are moving closer together, increase the frequency of the calibrated sound information between the first and the second given time.

* * * * *